United States Patent [19]

Kanno et al.

[11] Patent Number: 5,670,604
[45] Date of Patent: *Sep. 23, 1997

[54] PREPARATION OF A POLYCARBONATE BY MELT-POLYCONDENSATION OF A DIHYDRIC PHENOL AND A CARBONIC DIESTER

[75] Inventors: Tatsuya Kanno; Yutaka Fukuda, both of Hyogo, Japan

[73] Assignee: Daicel Chemical Industries, Ltd., Tokyo, Japan

[*] Notice: The portion of the term of this patent subsequent to Jun. 1, 2015, has been disclaimed.

[21] Appl. No.: 558,787

[22] Filed: Nov. 16, 1995

Related U.S. Application Data

[60] Continuation of Ser. No. 353,432, Dec. 9, 1994, Pat. No. 5,488,094, which is a division of Ser. No. 209,820, Mar. 11, 1994, Pat. No. 5,466,775, which is a division of Ser. No. 132,132, Oct. 5, 1993, abandoned.

[30] Foreign Application Priority Data

| Oct. 14, 1992 | [JP] | Japan | 4-275720 |
| Dec. 24, 1992 | [JP] | Japan | 4-344054 |
| Apr. 16, 1993 | [JP] | Japan | 5-89916 |
| Apr. 16, 1993 | [JP] | Japan | 5-89918 |
| Jul. 7, 1993 | [JP] | Japan | 5-167658 |
| Jul. 7, 1993 | [JP] | Japan | 5-167659 |
| Jul. 7, 1993 | [JP] | Japan | 5-167660 |

[51] Int. Cl.⁶ ............................................. C08G 64/00
[52] U.S. Cl. ...................... 528/196; 528/4; 528/198; 528/199
[58] Field of Search .......................... 528/4, 196, 199, 528/198

[56] References Cited

U.S. PATENT DOCUMENTS

| 4,871,795 | 10/1989 | Pawar | 524/267 |
| 5,276,109 | 1/1994 | Sakashita et al. | 525/461 |

*Primary Examiner*—Terressa Mosley
*Attorney, Agent, or Firm*—Flynn, Thiel, Boutell & Tanis, P.C.

[57] ABSTRACT

A process for preparing a substantially chloride-ion-free, high-molecular-weight, colorless and transparent polycarbonate by melt-polycondensing a dihydric phenol with a carbonic diester, which comprises using a carbonic diester which is substantially free from (A) phenyl salicylate, o-phenoxybenzoic acid and phenyl o-phenoxybenzoate, (B) tin ion, (C) methyl phenyl carbonate or (D) phenyl salicylate and o-phenoxybenzoic acid.

A process for preparing a thermally stable polycarbonate by melt-polycondensing a dihydric phenol with a carbonic diester, which comprises using a borate or, a compound selected from the group consisting of electron-donative amines and salts thereof as a catalyst, and optionally an acidic substance.

17 Claims, No Drawings

PREPARATION OF A POLYCARBONATE BY MELT-POLYCONDENSATION OF A DIHYDRIC PHENOL AND A CARBONIC DIESTER

This is a continuation of Ser. No. 08/353,432, filed Dec. 9, 1994, now U.S. Pat. No. 5,488,094, which is a division of Ser. No. 08/209,820, filed Mar. 11, 1994 now U.S. Pat. No. 5,466,775, which is a division of Ser. No. 08/132,132, filed Oct. 5, 1993 now abandoned.

BACKGROUND OF THE INVENTION

1. Field of the Invention

The present invention relates to a process for the preparation of a discoloration-free, high-molecular-weight polycarbonate which comprises melt-polycondensing a carbonic diester containing specific impurities in reduced amounts with a dihydric phenol through transesterification. Particularly, the present invention relates to a process for the preparation of a discoloration-free, high-molecular-weight polycarbonate which comprises melt-polycondensing a carbonic diester containing specific impurities in reduced amounts with a dihydric phenol through transesterification in the presence of (a) a basic nitrogenous compound and/or (b) an alkali metal compound and/or an alkaline earth metal compound as a catalyst(s).

Further, the present invention relates to a process for the preparation of a thermally stable polycarbonate. Particularly, the present invention relates to a process for the preparation of a thermally stable polycarbonate by melt-polycondensing a carbonic diester containing specific impurities in reduced amounts with a dihydric phenol through transesterification in the presence of a boric salt as a catalyst and an acidic substance which can neutralize the catalyst, or in the presence of a compound selected from the group consisting of electron-donative amines and salts thereof as a catalyst and an acidic substance which can neutralize the catalyst.

2. Description of the Related Art

Although a discoloration-free, high-molecular-weight polycarbonate is a general-purpose engineering thermoplastic which is useful in various fields, particularly as injection molding material or sheet material substituting for window pane, the processes for the preparation thereof according to the prior art had various problems.

The interfacial polycondensation process is generally effective in preparing a polycarbonate, but has disadvantages that the use of toxic phosgene is necessitated and that the formed polycarbonate is contaminated with residual chloride ion.

In order to overcome these disadvantages, Japanese Patent Publication-A No. 182888/1988 discloses a process for the preparation of a polycarbonate which comprises using liquid trichloromethyl chloroformate, which is a dimer of phosgene, instead of the toxic phosgene and polycondensing it with a special dihydric phenol by the interfacial process.

However, this patent document does not give any specific information about the special dihydric phenol with the exception of 9,9-bis(4-hydroxyphenyl)fluorenes. Further, although Angew. Chem. 99, 922(1987) describes that a polycarbonate is prepared from 2,2-bis(4-hydroxyphenyl) propane by using triphosgene instead of the toxic phosgene, a reaction mechanism wherein phosgene is generated is also described therein.

Further, it is proposed in Japanese Patent Publication-A No. 100824/1992 to use a diaryl carbonate having a xanthone content of 10 ppm or below. Although the use of such a carbonate can give a relatively light-colored polycarbonate, it has a problem that the obtained polycarbonate somewhat yellows as compared with that prepared by the phosgene process.

Furthermore, a process for the preparation of a polycarbonate using a catalyst comprising a combination of a nitrogenous basic compound with a boron compound is proposed, for example, in U.S. Pat. No. 4,590,257 (date of patent: May 20, 1986, assignee: General Electric). Although this process can give a relatively light-colored polycarbonate in spite of the poor activity of the catalyst on the polymerization, the process has problems that it takes a long time to complete the polymerization because of the low activity of the catalyst on the polymerization to result in low industrial productivity and that not only a side reaction is liable to occur during the polymerization to form a branched structure but also the obtained polycarbonate is poor in heat stability.

DISCLOSURE OF THE INVENTION

SUMMARY OF THE INVENTION

The present inventors have extensively studied to solve the above problems and have found that a coloration-free, high-molecular-weight polycarbonate can be prepared without using the toxic phosgene by melt-polycondensing a carbonic diester containing specific impurities in reduced amounts with a dihydric phenol through transesterification in the presence of (a) a basic nitrogenous compound and/or (b) an alkali metal compound and/or an alkaline earth metal compound as a catalyst(s).

Thus, the first embodiment of the present invention relates to a process for the preparation of a polycarbonate by melt-polycondensing a dihydric phenol with a carbonic diester, which comprises using a carbonic diester which is substantially free from (A) phenyl salicylate, o-phenoxybenzoic acid and phenyl o-phenoxybenzoate, (B) tin ion, i.e., a tin component, (C) methyl phenyl carbonate or (D) phenyl salicylate and o-phenoxybenzoic acid.

In the present invention, the term "polycarbonate" means polycarbonate homopolymer, polycarbonate copolymer and polyester carbonate.

The carbonic diester which is substantially free from (A) phenyl salicylate, o-phenoxybenzoic acid and phenyl o-phenoxybenzoate contains 50 ppm or below of a sum of phenyl salicylate, o-phenoxybenzoic acid and phenyl o-phenoxybenzoate. The carbonic diester which is substantially free from (B) tin ion contains 5 ppm or below of tin ion. The carbonic diester which is substantially free from (C) methyl phenyl carbonate contains 50 ppm or below of methyl phenyl carbonate. The carbonic diester which is substantially free from (D) phenyl salicylate and o-phenoxybenzoic acid contains 50 ppm or below of a sum of phenyl salicylate and o-phenoxybenzoic acid.

In the first embodiment of the present invention, the preferable carbonic diester has, further, a total water content of 0.3% by weight or below, a hydrolyzable chlorine content, i.e., a chlorine content in which the chlorine may be obtained by hydrolysis, of 3 ppm or below, a sodium ion content, i.e., a sodium component content, of 1 ppm or below, an iron ion content, i.e., an iron component content, of 1 ppm or below, a copper ion content, i.e., a copper component content, of 1 ppm or below and a phosphorus ion content, i.e., a phosphorus component content, of 20 ppm or below.

Although the catalyst to be used in the above processes is not limited, it is recommended to use (a) a catalyst selected from among basic nitrogenous compounds and/or (b) a catalyst selected from among alkali metal compounds and alkaline earth metal compounds.

Furthermore, the present inventors have extensively studied and have found a process for preparing a polycarbonate which is substantially free from chloride ion and is excellent in heat stability, without using toxic phosgene. The present invention has been accomplished on the basis of this finding.

Thus, the second embodiment of the present invention provides a process for the preparation of a thermally stable polycarbonate by melt-polycondensing a dihydric phenol wish a carboric diester, which comprises using a compound selected from the group consisting of borates or a compound selected from the group consisting of electron-donative amines and salts thereof as a catalyst, and optionally an acidic substance which can neutralize the catalyst, i.e., a basic catalyst.

In this process, a carboric diester containing specific impurities in reduced amounts is advantageously used as a monomer.

In this process, a carbonic diester, an ester or a phenol compound may be added to the reaction system as a terminal-blocking agent. The blocking agent is used in an amount of preferably 0.05 to 10 mole %, still preferably 1 to 5 mole % based on the dihydric phenol.

Further scope and the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Representative examples of the carbonic diester to be used in the present invention include diphenyl carbonate, ditolyl carbonate, bis(chlorophenyl) carbonate, m-cresyl carbonate, dinaphthyl carbonate, bis(biphenyl) carbonate, diethyl carbonate, dimethyl carbonate, dibutyl carbonate and dicyclohexyl carbonate, among which diphenyl carbonate is particularly preferable.

In the present invention, one or more carbonic diester(s) is(are) used as a monomer(s). Alternatively, a combination use of the carbonic diester with a dicarboxylic acid ester may conduct in the present invention. Examples of the dicarboxylic acid ester include diphenyl terephthalate and diphenyl isophthalate. In this case, the amount of the dicarboxylic acid ester is 50 mole % or below based on the sum of the carbonic diester and the dicarboxylic acid ester, and a polyester carbonate is obtained by melt-polycondensation. Namely, in the present invention, the term "carbonic diester" includes generally the dicarboxylic acid ester, too. When two or more carbonic diester are used, a copolymer is obtained.

In the first embodiment of the present invention, a carbonic diester, which is substantially free from (A) phenyl salicylate, o-phenoxybenzoic acid and phenyl o-phenoxybenzoate, (B) tin ion, (C) methyl phenyl carbonate or (D) phenyl salicylate and o-phenoxybenzoic acid, is used. These impurities effect the hue and heat-resistance of the resulting polymer.

In the first embodiment of the present invention, a carbonic diester, which has a total water content of 0.3% by weight or below, a chlorine content, in which the chlorine may be obtained by hydrolysis, of 3 ppm or below, a sodium ion content of 1 ppm or below, an iron ion content of 1 ppm or below, a copper ion content of 1 ppm or below and a phosphorus ion content of 20 ppm or below, and which has at least one of (A) a sum of phenyl salicylate, o-phenoxybenzoic acid and phenyl o-phenoxybenzoate contents of 50 ppm or below, (B) a tin ion content of 5 ppm or below and (C) a methyl phenyl carbonate content of 50 ppm or below, is preferably used. Alternatively, a carbonic diester having a total water content of 0.3% by weight or below, a chlorine content, in which the chlorine may be obtained by hydrolysis, of 3 ppm or below, a sodium ion content of 1 ppm or below, an iron ion content of 1 ppm or below, a copper ion content of 1 ppm or below, a phosphorus ion content of 20 ppm or below and (D) a sum of phenyl salicylate and o-phenoxybenzoic acid contents of 50 ppm or below, is preferably used. When a carbonic diester not satisfying these requirements other than the total water content is used, the resulting polycarbonate may be significantly discolored and have poor properties, particularly in heat stability. When the carbonic diester has a water content exceeding 0.3% by weight, the diester is hydrolyzed during the reaction to lose the molar balance of monomers, so that no polymer having a high degree of polymerization is formed.

In the present invention, the chlorine which contributes the chlorine content includes free chlorine ions, a chlorine present in the form of a salt, a chlorine which is present in the form of an organic chlorine compound and can be isolated by hydrolysis of the organic chlorine compound, and the like. Therefore, a chlorine present as a salt such as sodium chloride or potassium chloride and one obtained by hydrolysis of organic chlorine compound such as phenyl chloroformate also contribute the chlorine content of the present invention.

The removal of the above impurities from the carbonic diester can be conducted by, e.g., (1) a process of washing a carbonic diester with hot water or an aqueous weak-base solution, (2) a process of adding urea to a carbonic diester and heat-melting the obtained mixture, or (3) a process of adding a salt of an alkali or alkaline earth metal, for example, $Na_2CO_3$, $NaHCO_3$, $KH_2PO_4$ or $K_2HPO_4$, to a carbonic diester and distilling the obtained mixture in a vacuum.

The methods for measuring the impurities in the carbonic diester are described with respect to Examples of the present invention hereinafter.

In the second embodiment of the present invention, although the carbonic diester to be used as a monomer is not limited, those having impurities in a reduced amount, for example, those for the first embodiment of the present invention, are preferably used. Alternatively, a carbonic diester having a chlorine content, in which the chlorine may be obtained by hydrolysis, of 3 ppm or below, a sodium ion content of 1 ppm or below, an iron ion content of 1 ppm or below, a sum of phenyl salicylate, o-phenoxybenzoic acid and phenyl o-phenoxybenzoate contents of 50 ppm or below and a methyl phenyl carbonate content of 10 ppm or below, or a carbonic diester having a chlorine content, in which the chlorine may be obtained by hydrolysis, of 3 ppm or below, a sodium ion content of 1 ppm or below, an iron ion content of 1 ppm or below and a sum of phenyl salicylate, o-phenoxybenzoic acid and phenyl o-phenoxybenzoate contents of 50 ppm or below, is advantageously used.

Representative examples of the dihydric phenol to be used in the present invention include those represented by the following general formulae (I) to (IV):

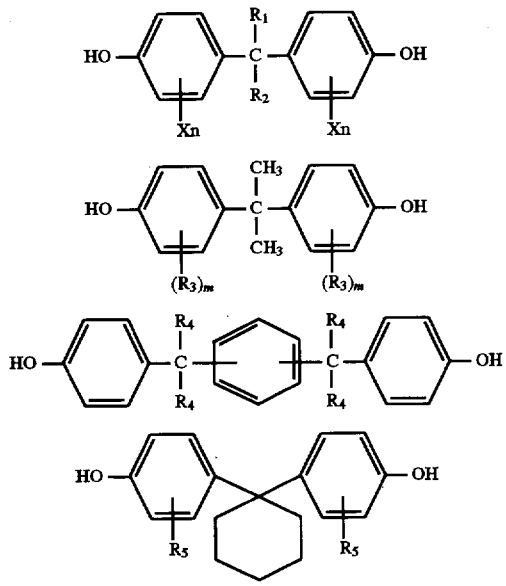

wherein $R_1$, $R_2$, $R_3$, $R_4$ and $R_5$ are each a hydrogen atom, a linear or branched alkyl group having 1 to 8 carbon atoms or a phenyl group; X is a halogen atom; n is 0 or an integer of 1 to 4 and m is an integer of i to 4.

Examples of the bisphenol, that is the dihydric phenol, represented by the formula (I) include 2,2-bis(4-hydroxyphenyl)propane, 2,2-bis(4-hydroxyphenyl)butane, 2,2-bis(4-hydroxyphenyl)-4-methylpentane, 2,2-bis(4-hydroxyphenyl)octane, 4,4'-dihydroxy-2,2,2-triphenylethane and 2,2-bis(3,5-dibromo-4-hydroxyphenyl) propane.

Examples of the bisphenol represented by the formula (II) include 2,2-bis(4-hydroxy-3-methylphenyl)propane, 2,2-bis (4-hydroxy-3-isopropylphenyl)propane, 2,2-bis(4-hydroxy-3-sec-butylphenyl)propane, 2,2-bis(3,5-dimethyl-4-hydroxyphenyl)propane and 2,2-bis(4-hydroxy-3-t-butylphenyl)propane.

Examples of the bisphenol represented by the formula (III) include 1,1'-bis(4-hydroxyphenyl)-p-diisopropylbenzene and 1,1'-bis(4-hydroxyphenyl)-m-diisopropylbenzene.

The bisphenol represented by the formula (IV) includes 1,1-bis(4-hydroxyphenyl)cyclohexane.

Further, a polycarbonate copolymer can be prepared by using two or more dihydric phenols selected from among those represented by the formulae (I) to (IV).

The necessary amount of the carbonic diester is equimolar with that of the dihydric phenol present in the reaction system. Generally, a carbonate compound must be reacted with a dihydric phenol at a molar ratio of 1:1 in order to form a high-molecular-weight polycarbonate. When bisphenyl carbonate is used as a carbonate compound, two mol of phenol is formed by the reaction of bisphenyl carbonate with the dihydric phenol. The phenol is distilled away from the reaction system. In the present invention, the carbonic diester is used in an amount of 1.01 to 1.5 mol, preferably 1.015 to 1.20 mol per mol of the dihydric phenol for the purpose of improving the physical properties of the polycarbonate, particularly for lowering the terminal hydroxyl content as much as possible to thereby get rid of adverse effect on the hue.

The terminal hydroxyl concentration of the polycarbonate obtained according to the present invention is in the range of preferably 3 to 70 mole %, still preferably 3 to 50 mole %, and particularly preferably 3 to 30 mole %. It is practically difficult to realize a terminal hydroxyl concentration of less than 3 mole %. On the country, when it exceeds 30 mole %, the resulting polymer is significantly discolored, and when it exceeds 50 mole %, the heat stability of the polymer is also impaired. A polycarbonate having a terminal hydroxyl concentration of 3 to 50 mole % can be used singly. A polycarbonate having a terminal hydroxyl concentration of above 50 to 70 mole % can be used in the form of a blend with another polymer.

To lower the terminal hydroxyl concentration of a resulting polymer, a carbonic diester, an ester or a phenol compound may be added to the reaction system as a terminal-blocking agent. The blocking agent is used in an amount of preferably 0.05 to 10 mole %, still preferably 1 to 5 mole % based on the dihydric phenol. Thus, the carbonic diester is used as a monomer and as a blocking agent. Accordingly, the amount of the carbonic diester effects the teminal hydroxyl concentration of a resulting polymer.

In the first embodiment of the present invention, the melt polycondensation of a dihydric phenol with a carbonic diester is conducted preferably in the presence of (a) a basic nitrogenous compound and/or (b) an alkali metal compound and/or an alkaline earth metal compound, still preferably in the presence of a basic nitrogenous compound and, optionally, an alkali metal compound or an alkaline earth metal compound as a catalyst(s).

Representative examples of the basic nitrogenous compound usable in the present invention include alkyl-, aryl- and alkylarylammonium hydroxides such as tetramethylammonium hydroxide ($Me_4NOH$), tetraethylammonium hydroxide ($Et_4NOH$), tetrabutylammonium hydroxide ($Bu_4NOH$) and trimethylbenzylammonium hydroxide ($C_6H_5$—$CH_2(Me)_3NOH$); tertiary amines such as trimethylamine, triethylamine, dimethylbenzylamine and triphenylamine; secondary amines represented by the formula: $R_2H$ (wherein R is an alkyl group such as a methyl or ethyl group or an aryl group such as a phenyl or tolyl group); primary amines represented by the formula: $RNH_2$ (wherein R is as defined above); ammonia; and basic salts such as tetramethylammonium borohydride ($Me_4NBH_4$), tetrabutylammonium borohydride ($Bu_4NBH_4$), tetrabutylammonium tetraphenylborate ($Bu_4NBPh_4$) and tetramethylammonium tetraphenylborate ($Mu_4NBPh_4$).

Other examples of the basic nitrogenous compound include 4-(4-methyl-1-piperidinyl)pyridine, N,N-dimethyl-4-aminopyridine, 4-diethylaminopyridine, 4-pyrrolidinopyridine, 4-aminopyridine, 2-aminopyridine, 2-hydroxypyridine, 2-methoxypyridine, 4-methoxypyridine, 4-hydroxypyridine, 2-dimethylaminoimidazole, 2-methoxyimidazole, 2-mercaptoimidazole, aminoquinoline, benzimidazole, imidazole, 2-methylimidazole, 4-methylimidazole, diazabicyclooctane (DABCO), 1,8-diazabicyclo[5.4.0]-7-undecene (DBU) and 4-(4-methylpyrrolidinyl)pyridine.

Representative examples of the alkali metal compound include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borate, lithium borate, potassium borate, sodium borohydride, lithium borohydride, potassium borohydride, sodium boroplenylate, sodium benzoate, potassium benzoate, lithium benzoate, disodium hydrogenphosphate, dipotassium hydrogenphosphate, dilithium hydrogenphosphate, disodium, dipotassium and dilithium salts of bisphenol A, and sodium, potassium and lithium salts of phenol, among which lithium borate, potassium borate and potassium acetate are preferable.

Representative examples of the alkaline earth metal compound include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, barium acetate, magnesium acetate, strontium acetate, calcium stearate, barium stearate, magnesium stearate and strontium stearate.

The amount of the basic nitrogenous compound to be used as a catalyst must range from $10^{-6}$ to $10^{-1}$ mol, preferably from $10^{-4}$ to $10^{-2}$ mol, per mol of the dihydric phenol present in the reaction system. If the amount is less than $10^{-6}$ mol, the catalytic activity is poor to result in slow polymerization, while if it exceeds $10^{-1}$ mol, the obtained polycarbonate is significantly contaminated with the catalyst to result in poor properties.

The total amount of the alkali metal compound and the alkaline earth metal compound to be used as a catalyst(s) must be within the range of $10^{-7}$ to $10^{-2}$ mol, preferably $10^{-5}$ to $10^{-3}$ mol, per mol of the dihydric phenol present in the reaction system. When the amount is less than $10^{-7}$ mol, the catalytic activity is too poor to obtain a polycarbonate having a desired degree of polymerization while when it exceeds $10^{-2}$ mol, the resulting polycarbonate is significantly be contaminated with the co-catalyst to result in poor properties.

In the second embodiment of the present invention, a compound selected from the group consisting of borates, or a compound selected from the group consisting of electron-donative amines and salts thereof is used as a catalyst. In the second embodiment of the present invention, an acidic substance which can neutralize the catalyst is also be used, advantageously.

Representative examples of the borate usable in the present invention as a transesterification catalyst include sodium diborate, sodium tetraborate, sodium pentaborate, sodium hexaborate, sodium octaborate, lithium metaborate, lithium tetraborate, lithium pentaborate, potassium metaborate, potassium tetraborate, potassium pentaborate, potassium hexaborate, potassium octaborate, ammonium metaborate, ammonium tetraborate, ammonium pentaborate, ammonium octaborate, ammonium borate, tetramethylammonium borate, aluminum potassium borate, cadmium borate, silver borate, copper borate, lead borate, nickel borate, magnesium borate and manganese borate, among which alkali metal salts of boric acid are preferable.

These borates may be used each alone or a combination of two or more of them may be used. When two or more of them are used, they may be added simultaneously with the feeding of the monomers or stepwise in the course of the reaction. When one borate is used, it may be fed into a reactor with the feeding of the monomers or stepwise in the course of the reaction.

The total amount of one or more member(s) selected from the group consisting of borates to be used as a catalyst is preferably $10^{-6}$ to $10^{-1}$ mol, still preferably $10^{-4}$ to $10^{-2}$ mol per mol of the dihydric phenol present in the reaction system. When the amount is less than $10^{-6}$ mol, the catalytic activity is low to result in too slow polymerization, while when it exceeds $10^{-1}$ mol, the resulting polycarbonate is significantly contaminated with the borate(s) to result in poor physical properties.

Examples of the electron-donative amine to be used in the present invention include 4-(4-methyl-1-piperidinyl) pyridine, N,N-dimethyl-4-aminopyridine, 4-diethylaminopyridine, 4-pyrrolidinopyridine, 4-aminopyridine, 2-aminopyridine, 2-hydroxypyridine, 2-methoxypyridine, 4-methoxypyridine, 4-hydroxypyridine, 2-dimethylaminoimidazole, 2-methoxyimidazole, 2-mercaptoimidazole, aminoquinoline, benzimidazole, imidazole, 2-methylimidazole, 4-methylimidazole, diazabicyclooctane (DABCO), 1,8-diazabicyclo[5.4.0]-7-undecene (DBU) and 4-(4-methylpyrrolidinyl)pyridine.

Further, representative examples of the acid which plays as a counter ion of the electrone-donative amine, that is, which constitutes part of a salt of an electrone-donative amine, include carbonic acid, acetic acid, formic acid, nitric acid, nitrous acid, oxalic acid, sulfuric acid, phosphric acid, fluoroboric acid and hydrogenboric acid.

These electron-donative amines and salts thereof may be used each alone or a combination of two or more of them may be used. When two or more of them are used, they may be added simultaneously with the feeding of the monomers or stepwise in the course of the reaction. When one compound is used, it may be fed into a reactor with the feeding of the monomers or stepwise in the course of the reaction.

The total amount of one or more member(s) selected from the group consisting of electrone-donative amines and salts thereof to be used as a catalyst is preferably $10^{-6}$ to $10^{-1}$ mol, still preferably $10^{-4}$ to $10^{-2}$ mol per mol of the dihydric phenol present in the reaction system. When the amount is less than $10^{-6}$ mol, the catalytic activity is low to result in too slow polymerization, while when it exceeds $10^{-1}$ mol, the resulting polycarbonate is significantly contaminated with the electrone-donative amine and/or salt thereof to result in poor physical properties.

The acidic substance usable for neutralizing the basic substance as a catalyst, i.e., the borate, the electrone-donative amine or the salt of the electrone-donative amine, in the present invention includes boric acid and ammonium hydrogenphosphite, which may be used alone or as a mixture of them.

When a borate is used as a catalyst, the acidic substance contributing to the thermal stability of a resulting polycarbonate is used preferably in a molar amount which is 1 to 500 times that of the catalyst used, still preferably in a molar amount which is 1 to 20 times that of the catalyst used. When the molar amount is smaller than that of the catalyst, no effect of imparting thermal stability is attained, while when the molar amount exceeds 500 times that of the catalyst used, the resulting polycarbonate has a low degree of polymerization unfavorably.

When an electrone-donative amine and/or a salt thereof is(are) used as a catalyst(s), the acidic substance contributing to the thermal stability of a resulting polycarbonate is used preferably in a molar amount which is 0.01 to 500 times that of the catalyst used, still preferably in a molar amount which is 1 to 20 times or 0.01 to 0.5 time that of the catalyst used. When the molar amount is smaller than 0.01 time that of the catalyst used, no effect of imparting thermal stability is attained, while when the molar amount exceeds 500 times that of the catalyst used, the resulting polycarbonate has a low degree of polymerization unfavorably.

The acidic substance may be added simultaneously with the feeding of the starting monomers (i.e., dihydric phenol and carbonic diester) and the transesterification catalyst, or may be added at an arbitrary point of time at which the relative viscosity of the formed polymer (as determined by the use of a methylene chloride solution having a polymer content of 0.5 g/dl at 20° C.) has reached about 1.1 or above. Alternatively, the acidic substance may be added to the reaction product, i.e., a polycarbonate, after the completion of the reaction to provide a polycarbonate composition.

In the processes according to the first and second embodiments of the present invention, the melt-polycondensation can proceed at a temperature ranging from 100° to about 300° C. The reaction temperature is preferably from 130° to 280° C. When the reaction temperature is lower than 100° C., the reaction is too slow, while when it exceeds 300° C., a side reaction is liable to occur.

In the second embodiment of the present invention, a phosphorus compound and/or a hindered phenol may be used to further improve the heat stability of the resulting polycarbonate.

Representative examples of the phosphorus compound usable in the present invention include triethyl phosphite, triisopropyl phosphite, triisodecyl phosphite, tridodecyl phosphite, phenyl diisodecyl phosphite, diphenyl isodecyl phosphite, triphenyl phosphite, tristolyl phosphite, phenyl bis(4-nonylphenyl) phosphite, tris(4-octylphenyl) phosphite, tris(4-(1-phanylethyl)phenyl) phosphite, tris(2,4-di-t-butylphenyl) phosphite, tetrakis-(2,4-di-t-butylphenyl) 4,4'-biphenylenediphosphonite represented by the following formula:

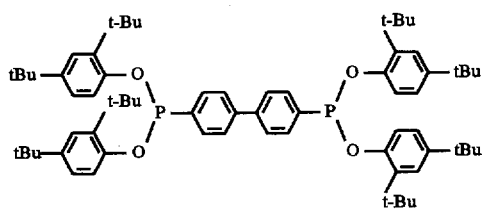

pentaerythritol di[(2,6-di-t-butyl-4-methylphenyl) phosphite] represented by the following formula:

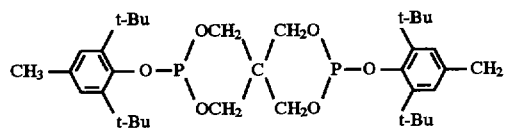

pentaerythritol di[(2,4-di-t-butylphenyl) phosphite] represented by the following formula:

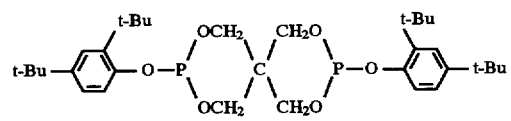

tetrakis(2,4-di-t-butylphenyl) 4,4'-(2,2-diphenylpropane) phosphonite represented by the following formula:

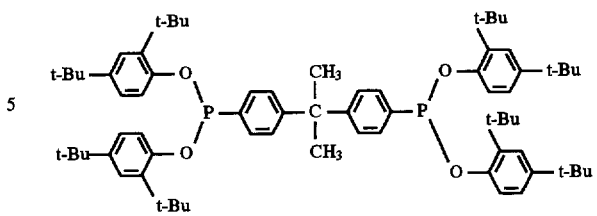

and dialkylphenylphosphites represented by the following formula:

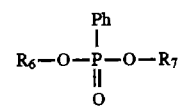

wherein $R_6$ and $R_7$ each represent a linear or branched alkyl group having 1 to 20 carbon atoms; and Ph represents a phenyl group.

Further, a combination of two or more of the above phosphorus compounds may be used.

The phosphorus compound may be added simultaneously with the feeding of the starting monomers or at an arbitrary point of time after the initiation or the reaction. Alternatively, the phosphorus compound may be added to the reaction product after the completion of the reaction to provide a polycarbonate composition.

The amount of the phosphorus compound to be used is preferably 10 to 1000 ppm based on the dihydric phenol. The addition thereof in an amount of less than 10 ppm is ineffective in improving the heat stability of the resulting polymer, while that in an amount exceeding 1000 ppm exerts an adverse effect on the physical properties of the resulting polymer unfavorably.

Representative examples of the hindered phenol usable in the present invention include octadecyl 3-(3,5-di-t-butyl-4-hydroxyphenyl)propionate, N,N'-hexamethylenebis(3,5-di-t-butyl-4-hydroxyhydrocinnamamide), triethylene glycol bis[3-(3-t-butyl-5-methyl-4-hydroxyphenyl)propionate], 1,6-hexanediol bis[3-(3,5-di-t-butyl-4-hydroxyphenyl) propionate], pentaerythritol tetrakis[3-(3,5-di-t-butyl-4-hydroxyphenyl)propicnate], diethyl 3,5-di-t-butyl-4-hydroxybenzylphosphonate, and compounds represented by the following formulae (A) to (C):

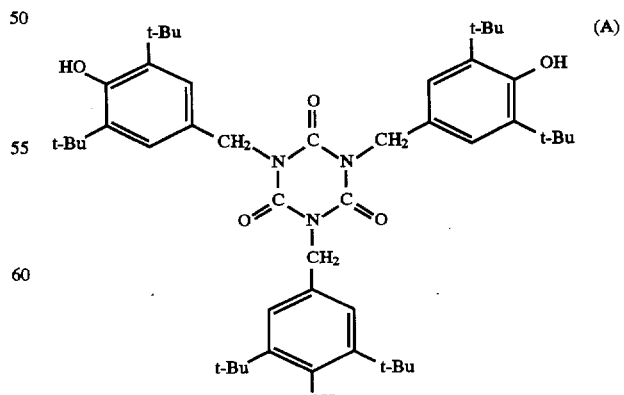

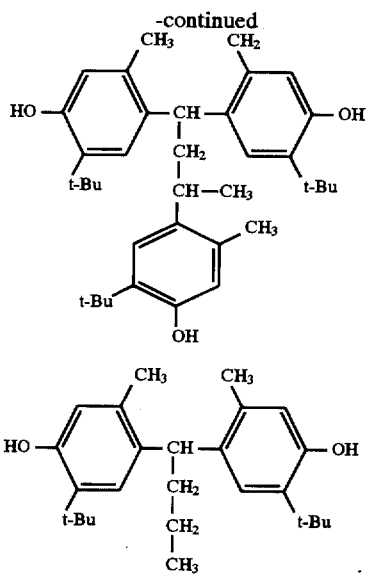

Further, a combination of two or more of the above hindered phenols may be used.

The hindered phenol may be added simultaneously with the feeding of the starting monomers or at an arbitrary point of time after the initiation or the reaction. Alternatively, the hindered phenol may be added to the reaction product after the completion of the reaction to provide a polycarbonate composition. Furthermore, the hindered phenol and the phosphorus compound may be added simultaneously or at different arbitrary points of time.

The hindered phenol is preferably added in an amount of 10 to 2000 ppm based on the dihydric phenol. The addition thereof in an amount of less than 10 ppm is ineffective in improving the heat stability of the resulting polymer, while that in an amount exceeding 2000 ppm exerts an adverse effect on the physical properties of the resulting polymer unfavorably.

According to the present invention, a substantially chloride-ion-free, high-molecular-weight, colorless and transparent polycarbonate can be prepared without using toxic phosgene by using a raw material little containing specific impurities and, as a catalyst system, (a) a basic nitrogenous compound and/or (b) an alkali metal compound and/or an alkaline earth metal compound.

Furtheremore, according to the present invention, a thermally stable polycarbonate or a thermally stable polycarbonate composition can be prepared without using toxic phosgene by using a borate or, an electrone-donative amine and/or a salt thereof as a catalyst(s), and an acidic substance.

EXAMPLES

The present invention will now be described in more detail with reference to the following Examples which should not be considered to limit the scope of the present invention.

Various values shown in the following Examples were determined as follows:

(1) Viscosity-average molecular weight (Mv)

The viscosity-average molecular weight (Mv) was determined by calculation based on the intrinsic viscosity [η] of a methylene chloride solution of each polycarbonate as determined at 20° C. with an Ubbellohde viscometer according to the following formula:

$$[\eta] = 1.11 \times 10^{-4} (M_v)^{0.82}$$

(2) Terminal hydroxyl concentration

The terminal hydroxyl concentration was determined by subjecting each polycarbonate to $^{13}C$-NMR spectroscopy according to the gated decoupling measurement mode and calculating the area ratio of the peak at 114.80 ppm to that at 129.50 ppm.

(3) Impurity contents a) Method for determining phenyl salicylate, o-phenoxybenzoic acid, phenyl o-phenoxybenzoate or methyl phenyl carbonate content The content was determined by the use of a gas chromatograph (mfd. by Shimadzu Corporation, GC-14A).

b) Method for determining chlorine content (Comp) Ex I-1 to I-11 and IV-1 to IV-7 A sample (5 g) was dissolved in 10 ml of toluene, followed by the addition of 10 ml of an eluent (an aqueous solution containing 2.8 mmol of $NaHCO_3$ and 2.25 mmol of $Na_2CO_3$) and 15 ml of highly deionized water in this order. The obtained mixture was shaken and then left to stand. The upper toluene layer formed was removed. The resulting aqueous layer was treated with C-18 SEP-PAK to be freed from contaminant toluene. The aqueous layer thus treated was subjected to ion chromatography (YOKOGAWA SAX-1) to determine the chlorine content.

(Comp.) Ex. II-1 to II-16 and III-1 to III-28 The chlorine content was determined by the use of ion chromatography (YOKOGAWA ELECTRIC WORKS IC 100).

c) Method for determining sodium ion or iron ion content

The content was determined with an atomic absorption spectrometer (SAS-727 mfd. by Seiko Instruments, Inc.).

d) Method for determining copper ion or phosphorus ion content

The content was determined with an inductively coupled plasma (ICP) emission spectrometer (mfd. by Shimadzu Corporation, ICPS-1000III).

e) Method for determining tin ion content

The content was determined with an atomic absorption spectrometer (mfd. by Shimadzu Corporation, AA-670 G) and a graphite furnaced analyzer (mfd. by Shimadzu Corporation, GFA-4A).

f) Method for determining water content

The content was determined with a trace water measuring apparatus (mfd. by Mitsubishi Chemical Industries Ltd., CA-05).

(4) Storage stability a) Hue

The hue (YI) of each polycarbonate, polyester carbonate or polycarbonate composition was determined on a color difference meter (mfd. by Nippon Denshoku, 300A) by the use of a sheet [50×50×2 mm (H-W-D)] prepared by the hot pressing quenching process, before and after storage at 160° C. for 720 hours.

b) Number of cleavages

A sheet (50 mm×50 mm) having a thickness of 0.5 mm was prepared with the polycarbonate, polyester carbonate or polycarbonate composition prepared in one of (Comparative) Examples II-1 to II-16 and III-1 to III-28 by the hot pressing quenching process. The obtained sheet was stored at 160° C. to determine the viscosity-average molecular weight of the polycarbonate or polyester carbonate constituting the sheet after 10, 20 and 30 days. The process for determining the viscosity-average molecular weight was the same as that described in the item (1) Viscosity-average molecular weight (Mv). Further, the number of cleavages of the polymer was calculated by the formula which will be described below.

$$\text{number of cleavages} = \frac{Mv_0}{Mv_t} - 1$$

$Mv_0$: initial viscosity-average molecular weight
$Mv_t$: viscosity-average molecular weight after t days

Example I-1

22.8 g (0.1 mol) of 2,2-bis(4-hydroxyphenyl)propane (BPA), 0.164 g ($2 \times 10^{-2}$ mol per mol of BPA) of 2-methylimidazole, 0.00082 g ($1 \times 10^{-4}$ mol per mol of BPA) of sodium acetate and 21.96 g (0.1025 mol) of diphenyl carbonate having impurity contents given in Table 1 were fed into a reactor and stirred together in a nitrogen atmosphere at 180° C. for one hour. The temperature of the resulting mixture was raised while gradually evacuating the reaction system. Finally, the mixture was polycondensed at 270° C. in a vacuum of 0.1 Torr for one hour, with the removal of formed phenol by distillation. Thus, a colorless transparent polycarbonate was obtained. The viscosity-average molecular weight (Mv) thereof was 27,600. The glass transition point thereof was 150° C. and the terminal hydroxyl content thereof was 28 mole %. To show the extent of discoloration thereof with storage, the initial hue and the hue after storage at 160° C. for 720 hours are given in Table 2.

Example I-2

Another colorless transparent polycarbonate was prepared through polycondensation in the same manner as that of Example I-1 except that 0.00122 g ($1 \times 10^{-4}$ mol per mol of BPA) of 4-dimethylaminopyridine was used instead of the 2-methylimidazole, 0.00098 g ($1 \times 10^{-4}$ mol per mol of BPA) of potassium carbonate was used instead of the sodium acetate and other diphenyl carbonate having impurity contents given in Table 1 was used. The viscosity-average molecular weight (Mv) thereof was 27,000. The glass transition point thereof was 150° C. and the terminal hydroxyl content thereof was 25 mole %. The initial hue and the hue after storage at 160° C. for 720 hours are given in Table 2.

Example I-3

11.4 g (50 mole % of the dihydric phenol to be used) of 2,2-bis(4-hydroxyphenyl)propane, 17.0 g (50 mole % of the dihydric phenol to be used) of 2,2-bis-(4-hydroxy-3-t-butylphenyl)propane, 0.00122 g ($1 \times 10^{-4}$ mol per mol of bisphenol, i.e., the dihydric phenol) of 4-dimethylaminopyridine, 0.000066 g ($1 \times 10^{-5}$ mol per mol of bisphenol, i.e., the dihydric pheno) of lithium acetate and 21.96 g (0.1025 mol) of diphenyl carbonate having impurity contents given in Table 1 were fed into a reactor and stirred together in a nitrogen atmosphere for 2 hours. The resulting mixture was polycondensed in the same manner as that of Example I-1 to give a colorless transparent polycarbonate. The viscosity-average molecular weight (Mv) thereof was 24,500 and the glass transition point thereof was 128° C. The terminal hydroxyl content thereof was 23 mole %. The initial hue and the hue after storage at 160° C. for 720 hours are given in Table 2.

Example I-4

Another colorless transparent polycarbonate was prepared through polycondensation in the same manner as that of Example I-1 except that 0.00091 g ($1 \times 10^{-4}$ mol per mol of BPA) of tetramethylammonium hydroxide was used instead of the 2-methylimidazole, 0.00098 g ($1 \times 10^{-4}$ mol per mol of BPA) of potassium acetate was used instead of the sodium acetate and other starting diphenyl carbonate having impurity contents given in Table 1 was used, and that the contents in the reactor, that is, the raw materials, were stirred together in a nitrogen atmosphere for 2 hours. The viscosity-average molecular weight (Mv) thereof was 27,800 and the glass transition point thereof was 151° C. Further, the terminal hydroxyl content thereof was 21 mole %. The initial hue and the hue after storage at 160° C. for 720 hours are given in Table 2.

Example I-5

22.8 g (0.1 mol) of 2,2-bis(4-hydroxyphenyl)propane (BPA), 0.0024 g ($2 \times 10^{-4}$ mol per mol of BPA) of 4-dimethylaminopyridine and 21.96 g (0.1025 mol) of diphenyl carbonate having impurity contents given in Table 1 were fed into a reactor and the resulting mixture was polycondensed in the same manner as that of Example I-1 to give a colorless transparent polycarbonate. The viscosity-average molecular weight (Mv) thereof was 29,000 and the glass transition point thereof was 150° C. Further, the terminal hydroxyl content thereof was 26 mole %. The initial hue and the hue after storage at 160° C. for 720 hours are given in Table 2.

Example I-6

22.8 g (0.1 mol) of 2,2-bis(4-hydroxyphenyl)propane (BPA), 0.00122 g ($1 \times 10^{-4}$ mol per mol of BPA) of 4-dimethylaminopyridine, $8.58 \times 10^{-8}$ g ($1 \times 10^{-6}$ mol per mol of BPA) of lithium borate and 21.96 g (0.1025 mol) of diphenyl carbonate having impurity contents given in Table 1 were fed into a reactor and the resulting mixture was polycondensed in the same manner as that of Example I-1 to give a colorless transparent polycarbonate. The viscosity-average molecular weight (Mv) thereof was 31,000 and the glass transition point thereof was 155° C. Further, the terminal hydroxyl content thereof was 24 mole %. The initial hue and the hue after storage at 160° C. for 720 hours are given in Table 2.

Comparative Example I-7

22.8 g (0.1 mol) of 2,2-bis(4-hydroxyphenyl)propane (BPA), 0.0024 g ($2 \times 10^{-4}$ mol per mol of BPA) of N,N-dimethylaminopyridine and 21.96 g (0.1025 mol) of diphenyl carbonate having impurity contents given in Table 1 were fed into a reactor and the resulting mixture was polycondensed in the same manner as that of Example I-1 to give a pale-red polycarbonate. The viscosity-average molecular weight (MV) thereof was 26,500 and the glass transition point thereof was 148° C. Further, the terminal hydroxyl content thereof was 40 mole %. The initial hue and the hue after storage at 160° C. for 720 hours are given in Table 2.

Comparative Example I-8

22.8 g (0.1 mol) of 2,2-bis(4-hydroxyphenyl)propane (BPA), 0.0024 g ($2 \times 10^{-4}$ mol per mol of BPA) of N,N- dimethylaminopyridine, 0.00098 g ($1\times10^{-4}$ mol per mol of BPA) of potassium acetate and 21.96 g (0.1025 mol) of diphenyl carbonate having impurity contents given in Table 1 were fed into a reactor and the resulting mixture was polycondensed in the same manner as that of Example I-1 to give a pale-red polycarbonate. The viscosity-average molecular weight (Mv) thereof was 19,500 and the glass transition point thereof was 130° C. The terminal hydroxyl content thereof was 35 mole %. The initial hue and the hue after storage at 160° C. for 720 hours are given in Table 2.

Comparative Example I-9

22.8 g (0.1 mol) of 2,2-bis(4-hydroxyphenyl)propane (BPA), 0.0024 g ($2\times10^{-4}$ mol per mol of BPA) of N,N-dimethylaminopyridine, 0.00098 g ($1\times10^{-4}$ mol per mol of BPA) of potassium acetate and 21.96 g (0.1025 g) of diphenyl carbonate having impurity contents given in Table 1 were fed into a reactor and the resulting mixture was polycondensed in the same manner as that of Example I-1 to give a yellow polycarbonate. The viscosity-average molecular weight (Mv) thereof was 24,500 and the glass transition point thereof was 145° C. Further, the terminal hydroxyl content thereof was 28 mole %. The initial hue and the hue after storage at 160° C. for 720 hours are given in Table 2.

Comparative Example I-10

22.8 g (0.1 mol) of 2,2-bis(4-hydroxyphenyl)propane (BPA), 0.0024 g ($2\times10^{-4}$ mol per mol of BPA) of N,N-dimethylaminopyridine, 0.00098 g ($1\times10^{-4}$ mol per mol of BPA) of potassium acetate and 21.96 g (0.1025 mol) of diphenyl carbonate having impurity contents given in Table 1 were fed into a reactor and the obtained mixture was polycondensed in the same manner as that of Example I-1 to give a pale-red polycarbonate. The viscosity-average molecular weight (Mv) thereof was 26,000 and the glass transition point thereof was 145° C. Further, the terminal hydroxyl content thereof was 25 mole %. The initial hue and the hue after storage at 160° C. for 720 hours are given in Table 2.

Example I-11

22.8 g (0.1 mol) of 2,2-bis(4-hydroxyphenyl)propane (BPA), 0.0024 g ($2\times10^{-4}$ mol per mol of BPA) of N,N-dimethylaminopyridine and 21.96 g (0.1025 mol) of diphenyl carbonate having impurity contents given in Table 1 were fed into a reactor and the resulting mixture was polycondensed in the same manner as that of Example I-1 to give a colorless transparent polycarbonate. The viscosity-average molecular weight (Mv) thereof was 15,800 and the glass transition point thereof was 130° C. Further, the terminal hydroxyl content thereof was 10 mole %. The initial hue and the hue after storage at 160° C. for 720 hours are given in Table 2.

TABLE 1

| Kinds of impurities | Ex. I-1 | Ex. I-2 | Ex. I-3 | Ex. I-4 | Ex. I-5 | Ex. I-6 | Comp. Ex. I-7 | Comp. Ex. I-8 | Comp. Ex. I-9 | Comp. Ex. I-10 | Ex. I-11 |
|---|---|---|---|---|---|---|---|---|---|---|---|
| total content of phenyl salicylate, o-phenoxybenzoic acid and phenyl o-phenoxybenzoate | 40 | 42 | 38 | 45 | 35 | 35 | 60 | 40 | 60 | 40 | 40 |
| tin ion content | 0.9 | 0.2 | 1 | 0.3 | 0.8 | 1 | 1 | 6 | 10 | 5 | 1.5 |
| methyl phenyl carbonate content | 8 | 7 | 5 | 9 | 4 | 7 | 8 | 60 | 25 | 100 | 5 |
| chlorine content | <0.5 | <0.5 | <0.5 | <0.5 | <0.5 | <0.5 | <0.5 | <0.5 | <0.5 | <0.5 | 4 |
| sodium ion content | <0.5 | <0.5 | <0.5 | <0.5 | <0.5 | <0.6 | <0.5 | 0.8 | 0.8 | 0.8 | 0.5 |
| iron ion content | <0.1 | <0.1 | <0.1 | <0.1 | <0.1 | <0.1 | <0.1 | 0.5 | 0.7 | 0.5 | 1.5 |
| copper ion content | <0.05 | <0.02 | <0.01 | <0.005 | <0.01 | <0.1 | <0.1 | 0.5 | 0.6 | <0.1 | 3 |
| phosphorus ion content (ppm) | 12 | 10 | 15 | 1 | 13 | 12 | 10 | 15 | 18 | 25 | 15 |
| water content (wt %) | 0.25 | 0.23 | 0.28 | 0.25 | 0.21 | 0.23 | 0.25 | 0.40 | 0.25 | 0.20 | 0.45 |

TABLE 2

| | | Ex. I-1 | Ex. I-2 | Ex. I-3 | Ex. I-4 | Ex. I-5 | Ex. I-6 | Comp. Ex. I-7 | Comp. Ex. I-8 | Comp. Ex. I-9 | Comp. Ex. I-10 | Ex. I-11 |
|---|---|---|---|---|---|---|---|---|---|---|---|---|
| Heat stability | initial hue (YI) | 1.5 | 1.6 | 1.8 | 1.8 | 1.3 | 1.8 | 2.5 | 2.1 | 9.5 | 2.6 | 2.0 |
| | hue after storage at 160° C. for 720 hours (YI) | 10.8 | 12.5 | 16.3 | 14.1 | 10.2 | 17.4 | 31.2 | 38.3 | 45.3 | 39.6 | 48.4 |

Example II-1

4560 g (20 mol) of 2,2-bis(4-hydroxyphenyl)propane, 4391.5 g (20.5 mol) of diphenyl carbonate having impurity contents given in Table 3, 38 mg ($1\times10^{-4}$ mol) of sodium tetraborate and 30.9 mg ($5\times10^{-4}$ mol) of boric acid were fed into a nickel-lined reactor of bath type. The contents in the reactor was molten in a nitrogen atmosphere at 160° C. and stirred together for one hour. While evacuating the system gradually, the temperature of the obtained mixture was raised to conduct polycondensation finally in a vacuum of 1 Torr at 270° C. for 4 hours with formed phenol being distilled off. The resulting mixture was further reacted in a vertical twin-screw reactor of self-cleaning type for 50 minutes to give a colorless transparent polycarbonate. The viscosity-average molecular weight (Mv) of the polycarbonate was 35,000. Further, the terminal hydroxyl content thereof was 18 mole %. The numbers of cleavages after storage, which indicate the degree of thermal degradation of the polycarbonate, are given in Table 3. Furthermore, to show the extent of discoloration of the polycarbonate with storage, the initial hue and the hue after storage at 160° C. for 720 hours are given in Table 3.

Example II-2

Another colorless transparent polycarbonate was prepared through polycondensation in the same manner as that of Example II-1 except that 30.5 mg ($1\times10^{-4}$ mol) of potassium octaborate was used instead of the sodium tetraborate (38 mg, $1\times10^{-4}$ mol) and other diphenyl carbonate having impurity contents given in Table 3 was used. The viscosity-average molecular weight (Mv) of the obtained resin was 38,000. Further, the terminal hydroxyl content thereof was 21 mole %. The numbers of cleavages after storage are given in Table 3. Furthermore, the initial hue and the hue after storage at 160° C. for 720 hours are given in Table 3.

Example II-3

Another colorless transparent polycarbonate was prepared through polycondensation in the same manner as that of Example II-1 except that 19 mg ($5\times10^{-5}$ mol) of sodium tetraborate and 15.3 mg ($5\times10^{-5}$ mol) of potassium octaborate were used instead of the sodium tetraborate (38 mg, $1\times10^{-4}$ mol), the amount of boric acid used was 40 mg ($6.5\times10^{-4}$ mol) and other diphenyl carbonate having impurity contents given in Table 3 was used. The viscosity-average molecular weight (Mv) of the obtained resin was 32,000. Further, the terminal hydroxyl content thereof was 16 mole %. The numbers of cleavages after storage are given in Table 3. Furthermore, the initial hue and the hue after storage at 160° C. for 720 hours are given in Table 3.

Example II-4

Another colorless transparent polycarbonate was prepared through polycondensation in the same manner as that of Example II-1 except that 50 mg ($5\times10^{-4}$ mol) of ammonium hydrogenphosphate was used instead of the boric acid (30.9 mg, $5\times10^{-4}$ mol) and other diphenyl carbonate having impurity contents given in Table 3 was used. The viscosity-average molecular weight (Mv) of the obtained resin was 29,500. Further, the terminal hydroxyl content thereof was 23 mole %. The numbers of cleavages after storage are given in Table 3. Furthermore, the initial hue and the hue after storage at 160° C. for 720 hours are given in Table 3.

Example II-5

3648 g (16 mol) of 2,2-bis(4-hydroxyphenyl)propane, 1272 g (4 mol) of diphenyl isophthalate, 4391.5 g (20.5 mol) of diphenyl carbonate having impurity contents given in Table 3, 38 mg ($1\times10^{-4}$ mol) of sodium tetraborate and 30.9 mg ($5\times10^{-4}$ mol) of boric acid were fed into the same reactor as that used in Example II-1. The contents in the reactor was molten in a nitrogen atmosphere at 180° C. and stirred together for one hour. Thereafter, the molten mixture was treated in the same manner as that of Example II-1 to conduct polycondensation, thus giving a polyester carbonate copolymer. The viscosity-average molecular weight (Mv) of the obtained resin was 29,200. Further, the terminal hydroxyl content thereof was 18 mole %. The numbers of cleavages after storage are given in Table 3. Furthermore, the initial hue and the hue after storage at 160° C. for 720 hours are given in Table 3.

Example II-6

Another colorless transparent polycarbonate was prepared in the same manner as that of Example II-1 except that other diphenyl carbonate having impurity contents given in Table 3 was used and 100 ppm of tris(2,4-di-t-butylphenyl) phosphite as a phosphorus compound was further added in addition to the raw materials used in Example II-1. 200 ppm of octadecyl 3-(3,5-di-t-butyl-4-hydroxyphenyl)propionate as a hindered phenol was added to the polycarbonate obtained when the polycarbonate was still in a molten state to prepare a polycarbnate composition. The polycarbnate composition was extruded with a gear pump into a strand, which was cut. The viscosity-average molecular weight (Mv) of the polycarbonate was 26,700. Further, the terminal hydroxyl content thereof was 16 mole %. The numbers of cleavages after storage are given in Table 3. Furthermore, the initial hue and the hue after storage at 160° C. for 720 hours are given in Table 3.

Example II-7

Another colorless transparent polycarbonate was prepared through polycondensation in the same manner as that of Example II-1 except that 17.2 mg ($2\times10^{-4}$ mol) of lithium metaborate was used instead of the sodium tetraborate (38 mg, $1\times10^{-4}$ mol), the amount of boric acid was 61.8 mg ($1\times10^{-3}$ mol) and other diphenyl carbonate having impurity contents given in Table 3 was used. The viscosity-average molecular weight (Mv) of the obtained resin was 31,000. The terminal hydroxyl content thereof was 17 mole %. The numbers of cleavages after storage are given in Table 3. Furthermore, the initial hue and the hue after storage at 160° C. for 720 hours are given in Table 3.

Example II-8

Another colorless transparent polycarbonate was prepared through polycondensation in the same manner as that of Example II-1 except that 17.2 mg ($2\times10^{-4}$ mol) of lithium metaborate was used instead of the sodium tetraborate (38 mg, $1\times10^{-4}$ mol), the amount of boric acid was 3.09 g ($5\times10^{-2}$ mol) and other diphenyl carbonate having impurity contents given in Table 3 was used. The viscosity-average molecular weight (Mv) of the obtained resin was 28,500 and the terminal hydroxyl content thereof was 15 mole %. The numbers of cleavages after storage are given in Table 3. Furthermore, the initial hue and the hue after storage at 160° C. for 720 hours are given in Table 3.

Example II-9

The same procedure as that of Example II-1 was repeated except that diphenyl carbonate containing the specific impurities in larger amounts was used instead of the diphenyl carbonate used in Example II-1 and that no boric acid was used. A pale-yellow polycarbonate was obtained. The viscosity-average molecular weight (Mv) of the obtained resin was 29,500 and the terminal hydroxyl content thereof was 48 mole %. The numbers of cleavages after storage are given in Table 3. Furthermore, the initial hue and the hue after storage at 160° C. for 720 hours are given in Table 3.

Example II-10

The same procedure as that of Example II-1 was repeated except that diphenyl carbonate containing the specific impurities in larger amounts was used instead of the diphenyl carbonate used in Example II-1. A pale-yellow polycarbonate was obtained. The viscosity-average molecular weight (Mv) of the obtained resin was 28,600 and the terminal hydroxyl content thereof was 38 mole %. The numbers of cleavages after storage are given in Table 3. Furthermore, the initial hue and the hue after storage at 160° C. for 720 hours are given in Table 3.

Comparative Example II-11

The same procedure as that of Example II-1 was repeated except that 0.2 mg ($5 \times 10^{-6}$ mol) of sodium hydroxide was used instead of the sodium tetraborate and other diphenyl carbonate having impurity contents given in Table 3 was used. A pale-red polycarbonate was obtained. The viscosity-average molecular weight (Mv) of the obtained resin was 30,500 and the terminal hydroxyl content thereof was 35 mole %. The numbers of cleavages after storage are given in Table 3. Furthermore, the initial hue and the hue after storage at 160° C. for 720 hours are given in Table 3.

$1 \times 10^{-4}$ mol), the amount of boric acid used was 40 mg ($6.5 \times 10^{-4}$ mol) and other diphenyl carbonate having impurity contents given in Table 4 was used. The viscosity-average molecular weight (Mv) of the obtained resin was 32,000. The numbers of cleavages after storage are given in Table 4. Furthermore, the initial hue and the hue after storage at 160° C. for 720 hours are given in Table 4.

Example II-13

Another colorless transparent polycarbonate was prepared through polycondensation in the same manner as that of Example II-1 except that 50 mg ($5 \times 10^{-4}$ mol) of ammonium hydrogenphosphate was used instead of the boric acid (30.9 mg, $5 \times 10^{-4}$ mol) and other diphenyl carbonate having impurity contents given in Table 4 was used. The viscosity-average molecular weight (Mv) of the obtained resin was 29,500. The numbers of cleavages after storage are given in Table 4. Furthermore, the initial hue and the hue after storage at 160° C. for 720 hours are given in Table 4.

Example II-14

3648 g (18 mol) of 2,2-bis(4-hydroxyphenyl)propane, 1272 g (4 mol) of diphenyl isophthalate, 4391.5 g (20.5 mol) of diphenyl carbonate having impurity contents given in Table 4, 38 mg ($1 \times 10^{-4}$ mol) of sodium tetraborate and 30.9 mg ($5 \times 10^{-4}$ mol) of boric acid were fed into the same reactor as that used in Example II-1. The contents in the reactor was molten in a nitrogen atmosphere at 180° C. and stirred together for one hour. Thereafter, the molten mixture was treated in the same manner as that of Example II-1 to conduct polycondensation, thus giving a polyester carbonate

TABLE 3

| | | Ex. II-1 | Ex. II-2 | Ex. II-3 | Ex. II-4 | Ex. II-5 | Ex. II-6 | Ex. II-7 | Ex. II-8 | Ex. II-9 | Ex. II-10 | Comp. Ex. II-11 |
|---|---|---|---|---|---|---|---|---|---|---|---|---|
| Impurities in diphenyl carbonate (ppm) | Cl | 2 | 2 | <0.5 | 1.5 | 2 | <0.5 | 2 | 2 | 2 | 4 | 2 |
| | Fe | <0.5 | <0.5 | <0.5 | <0.5 | <0.5 | <0.5 | <0.5 | <0.5 | <0.5 | 1.5 | <0.5 |
| | Na | <0.5 | <0.5 | <0.5 | <0.5 | <0.5 | <0.5 | <0.5 | <0.5 | <0.5 | 1.5 | <0.5 |
| | Cu | <0.05 | <0.03 | <0.01 | <0.01 | <0.01 | <0.1 | <0.1 | <0.1 | <0.1 | <0.5 | <0.5 |
| | P | 15 | 10 | 15 | 1 | 13 | 12 | 15 | 15 | 12 | 10 | 10 |
| | Sn | 0.5 | 0.2 | 1.0 | 0.3 | 0.8 | 1.0 | 0.8 | 0.8 | 10.2 | 1.2 | 4.0 |
| | sum of phenyl salicylate, o-phenoxybenzoic acid and phenyl o-phenoxybenzoate | 30 | 35 | 40 | 45 | 35 | 35 | 30 | 30 | 35 | 70 | 35 |
| | methyl phenyl carbonate | 8 | 6 | 8 | 5 | 4 | 7 | 6 | 5 | 12 | 11 | 12 |
| | water content (wt %) | 0.25 | 0.23 | 0.28 | 0.25 | 0.21 | 0.23 | 0.25 | 0.23 | 0.25 | 0.25 | 0.23 |
| Thermal degradation (160° C.) | no. of cleavages after 10 days ($t_{10}$) | 0.01 | 0.02 | 0.02 | 0.03 | 0.01 | 0.01 | 0.02 | 0.01 | 0.06 | 0.02 | 0.04 |
| | no. of cleavages after 20 days ($t_{20}$) | 0.05 | 0.07 | 0.05 | 0.08 | 0.03 | 0.04 | 0.05 | 0.05 | 0.12 | 0.10 | 0.12 |
| | no. of cleavages after 30 days ($t_{30}$) | 0.06 | 0.08 | 0.07 | 0.09 | 0.05 | 0.05 | 0.06 | 0.05 | 0.19 | 0.13 | 0.15 |
| Heat resistance test hue (yellow Index) | initial ($t_0$) | 1.0 | 1.2 | 1.2 | 1.4 | 3.0 | 1.0 | 1.1 | 1.2 | 1.6 | 1.7 | 1.9 |
| | after 30 days ($t_{30}$) | 12 | 13 | 14 | 14 | 14 | 11 | 12 | 10 | 21 | 21 | 21 |

Example II-12

Another colorless transparent polycarbonate was prepared through polycondensation in the same manner as that of Example II-1 except that 19 mg ($5 \times 10^{31\ 5}$ mol) of sodium tetraborate and 15.3 mg ($5 \times 10^{-5}$ mol) of potassium octaborate were used instead of the sodium tetraborate (38 mg, copolymer. The viscosity-average molecular weight (Mv) of the obtained resin was 29,200. The numbers of cleavages after storage are given in Table 4. Furthermore, the initial hue and the hue after storage at 160° C. for 720 hours are given in Table 4.

Example II-15

Another colorless transparent polycarbonate was prepared in the same manner as that of Example II-1 except that other diphenyl carbonate having impurity contents given in Table 4 was used and 100 ppm of tris(2,4-di-t-butylphenyl)phosphite as a phosphorus compound was further added in addition to the raw materials used in Example II-1. 200 ppm of octadecyl 3-(3,5-di-t-butyl-4-hydroxyphenyl)propionate as a hindered phenol was added to the polycarbonate obtained when the polycarbonate was still in a molten state to prepare a polycarbonate composition. The polycarbonate composition was extruded with a gear pump into a strand, which was cut. The viscosity-average molecular weight (Mv) of the polycarbonate was 26,700. The numbers of cleavages after storage are given in Table 4. Furthermore, the initial hue and the hue after storage at 160° C. for 720 hours are given in Table 4.

Example II-16

Another colorless transparent polycarbonate was prepared through polycondensation in the same manner as that of Example II-1 except that 17.2 mg ($2 \times 10^{-4}$ mol) of lithium metaborate was used instead of the sodium tetraborate (38 mg, $1 \times 10^{-4}$ mol), the amount of boric acid was 61.8 mg ($1 \times 10^{-3}$ mol) and other diphenyl carbonate having impurity contents given in Table 4 was used. The viscosity-average molecular weight (Mv) of the obtained resin was 31,000. The numbers of cleavages after storage are given in Table 4. Furthermore, the initial hue and the hue after storage at 160° C. for 720 hours are given in Table 4.

TABLE 4

| | | Ex. II-12 | Ex. II-13 | Ex. II-14 | Ex. II-15 | Ex. II-16 |
|---|---|---|---|---|---|---|
| Impurities in diphenyl carbonate (ppm) | Cl | 1 | 1.5 | 2 | 2 | 2 |
| | Fe | <0.5 | <0.5 | <0.5 | <0.5 | <0.5 |
| | Na | <0.5 | <0.5 | <0.5 | <0.5 | <0.5 |
| | sum of phenyl salicylate, o-phenoxybenzoic acid and phenyl o-phenoxybenzoate | 40 | 35 | 35 | 30 | 35 |
| | methyl phenyl carbonate | 8 | 5 | 8 | 5 | 6 |
| Thermal degradation (160° C.) | no. of cleavages after 10 days ($t_{10}$) | 0.02 | 0.03 | 0.01 | 0.01 | 0.02 |
| | no. of cleavages after 20 days ($t_{20}$) | 0.05 | 0.08 | 0.03 | 0.04 | 0.05 |
| | no. of cleavages after 30 days ($t_{30}$) | 0.07 | 0.09 | 0.05 | 0.05 | 0.06 |
| Heat resistance test hue (yellow Index) | initial ($t_0$) | 1.2 | 1.4 | 3.0 | 1.0 | 1.1 |
| | after 30 days ($t_{30}$) | 14 | 14 | 14 | 11 | 12 |

Example III-1

4560 g (20 mol) of 2,2-bis(4-hydroxyphenyl)propane, 4391.5 g (20.5 mol) of diphenyl carbonate having impurity contents given in Table 5, 489 mg ($1 \times 10^{-3}$ mol) of N,N-dimethyl-4-aminopyridine and 1.2366 g ($2 \times 10^{-2}$ mol) of boric acid were fed into a nickel-lined reactor of bath type. The contents in the reactor was molten in a nitrogen atmosphere at 160° C. and stirred together for one hour. While evacuating the system gradually, the temperature of the obtained mixture was raised to conduct polycondensation finally in a vacuum of 1 Torr at 270° C. for 4 hours with formed phenol being distilled off. The resulting mixture was further reacted in a vertical twin-screw reactor of self-cleaning type for 50 minutes to give a colorless transparent polycarbonate. The viscosity-average molecular weight (Mv) of the polycarbonate was 29,000. Further, the terminal hydroxyl content thereof was 18 mole %. The numbers of cleavages after storage, which indicate the degree of thermal degradation of the polycarbonate, are given in Table 5. Furthermore, to show the extent of discoloration of the polycarbonate with storage, the initial hue and the hue after storage at 160° C. for 720 hours are given in Table 5.

Example III-2

Another colorless transparent polycarbonate was prepared through polycondensation in the same manner as that of Example III-1 except that 736 mg ($4 \times 10^{-3}$ mol) of carbonate of N,N-dimethyl-4-aminopyridine was used instead of the N,N-dimethyl-4-aminopyridine (489 mg, $4 \times 10^{-3}$ mol), the amount of boric acid was 618 mg ($1 \times 10^{-2}$ mol) and other diphenyl carbonate having impurity contents given in Table 5 was used. The viscosity-average molecular weight (Mv) of the obtained resin was 27,500. Further, the terminal hydroxyl content thereof was 11 mole %. The numbers of cleavages after storage are given in Table 5. Furthermore, the initial hue and the hue after storage at 160° C. for 720 hours are given in Table 5.

Example III-3

Another colorless transparent polycarbonate was prepared through polycondensation in the same manner as that of Example III-1 except that 245 mg ($2 \times 10^{-3}$ mol) of N,N-dimethyl-4-aminopyridine and 368 mg ($2 \times 10^{-3}$ mol) of carbonate of N,N-dimethyl-4-aminopyridine were used instead of the N,N-dimethyl-4-aminopyridine (489 mg, $4 \times 10^{-3}$ mol), the amount of boric acid used was 250 mg ($4 \times 10^{-3}$ mol) and other diphenyl carbonate having impurity contents given in Table 5 was used. The viscosity-average molecular weight (Mv) of the obtained resin was 28,400. Further, the terminal hydroxyl content thereof was 16 mole %. The numbers of cleavages after storage are given in Table 5. Furthermore, the initial hue and the hue after storage at 160° C. for 720 hours are given in Table 5.

Example III-4

Another colorless transparent polycarbonate was prepared through polycondensation in the same manner as that of Example III-1 except that 1.98 g ($2 \times 10^{-2}$ mol) of ammonium hydrogenphosphate was used instead of the boric acid (1.2366 g, $2 \times 10^{-2}$ mol) and other diphenyl carbonate having impurity contents given in Table 5 was used. The viscosity-average molecular weight (Mv) of the obtained resin was 26,000. Further, the terminal hydroxyl content thereof was 23 mole %. The numbers of cleavages after storage are given in Table 5. Furthermore, the initial hue and The hue after storage at 160° C. for 720 hours are given in Table 5.

Example III-5

2280 g (10 mol) of 2,2-bis(4-hydroxyphenyl)propane, 3400 g (10 mol) of 2,2-bis(4-hydroxy-3-t-butylphenyl)propane, 4349 g (20.3 mol) of diphenyl carbonate having impurity contents given in Table 5, 489 mg ($4 \times 10^{-3}$ mol) of N,N-dimethyl-4-aminopyridine and 1.2366 g ($2 \times 10^{-2}$ mol) of boric acid were fed into the same reactor as that used in Example III-1. The contents in the reactor was treated in the same manner as that of Example III-1 to prepare a polyester carbonate copolymer (random proportion: about 50%). The viscosity-average molecular weight (Mv) of the obtained resin was 26,500. Further, the terminal hydroxyl content thereof was 18 mole %. The numbers of cleavages after storage are given in Table 5. Furthermore, the initial hue and the hue after storage at 160° C. for 720 hours are given in Table 5.

The random proportion of the polyester carbonate copolymer was determined by subjecting the copolymer to $^{13}$C-NMR spectroscopy according to the chemical shift of carbon in the carbonate bond.

Example III-6

3648 g (16 mol) of 2,2-bis(4-hydroxyphenyl)propane, 1272 g (4 mol) of diphenyl isophthalate, 4391.5 g (20.5 mol) of diphenyl carbonate having impurity contents given in Table 5, 489 mg ($4 \times 10^{-3}$ mol) of N,N-dimethyl-4-aminopyridine and 1.2366 g ($2 \times 10^{-2}$ mol) of boric acid were fed into the same reactor as that used in Example III-1. The contents in the reactor was molten in a nitrogen atmosphere at 180° C. and stirred together for one hour. Thereafter, the molten mixture was treated in the same manner as that of Example III-1 to conduct polycondensation, thus giving a polyester carbonate copolymer. The viscosity-average molecular weight (Mv) of the obtained resin was 29,200. Further, the terminal hydroxyl content thereof was 16 mole %. The numbers of cleavages after storage are given in Table 5. Furthermore, the initial hue and the hue after storage at 160° C. for 720 hours are given in Table 5.

Example III-7

Another colorless transparent polycarbonate was prepared in the same manner as that of Example III-1 except that other diphenyl carbonate having impurity contents given in Table 5 was used and 100 ppm of tris(2,4-di-t-butylphenyl) phosphite as a phosphorus compound was further added in addition to the raw materials used in Example III-1. 200 ppm of octadecyl 3-(3,5-di-t-butyl-4-hydroxyphenyl)propionate as a hindered phenol was added to the polycarbonate obtained when the polycarbonate was still in a molten state to prepare a polycarbonate composition. The polycarbonate composition was extruded with a gear pump into a strand, which was cut. The viscosity-average molecular weight (Mv) of the polycarbonate was 26,700. Further, the terminal hydroxyl content thereof was 17 mole %. The numbers of cleavages after storage are given in Table 5. Furthermore, the initial hue and the hue after storage at 160° C. for 720 hours are given in Table 5.

Example III-8

4560 g (20 mol) of 2,2-bis(4-hydroxyphenyl)propane, 4391.5 g (20.5 mol) of diphenyl carbonate having impurity contents given in Table 5, 489 mg ($4 \times 10^{-3}$ mol) of N,N-dimethyl-4-aminopyridine and 24.732 g ($4 \times 10^{-1}$ mol) of boric acid were fed into the same reactor as that used in Example III-1. The contents in the reactor was molten in a nitrogen atmosphere at 200° C. and stirred together for one hour. While evacuating the system gradually, the temperature of the obtained mixture was raised to conduct polycondensation finally in a vacuum of 1 Torr at 270° C. for 4 hours with formed phenol being distilled off. The resulting mixture was further reacted in a vertical twin-screw reactor of self-cleaning type for 80 minutes to give a colorless transparent polycarbonate. The viscosity-average molecular weight (Mv) of the obtained resin was 23,000. Further, the terminal hydroxyl content thereof was 28 mole %. The numbers of cleavages after storage are given in Table 5. Furthermore, the initial hue and the hue after storage at 160° C. for 720 hours are given in Table 5.

Example III-9

The same procedure as that of Example III-1 was repeated except that diphenyl carbonate containing the specific impurities in larger amounts was used instead of the diphenyl carbonate used in Example III-1 and that no boric acid was used. A pale-yellow polycarbonate was obtained. The viscosity-average molecular weight (Mv) of the obtained resin was 29,500 and the terminal hydroxyl content thereof was 48 mole %. The numbers of cleavages after storage are given in Table 5. Furthermore, the initial hue and the hue after storage at 160° C. for 720 hours are given in Table 5.

Example III-10

The same procedure as that of Example III-1 was repeated except that diphenyl carbonate containing the specific impurities in larger amounts was used instead of the diphenyl carbonate used in Example III-1. A pale-yellow polycarbonate was obtained. The viscosity-average molecular weight (Mv) of the obtained resin was 28,600 and the terminal hydroxyl content thereof was 38 mole %. The numbers of cleavages after storage are given in Table 5. Furthermore, the initial hue and the hue after storage at 160° C. for 720 hours are given in Table 5.

Example III-11

The same procedure as that of Example III-1 was repeated except that diphenyl carbonate containing the specific impurities in larger amounts was used instead of the diphenyl carbonate used in Example III-1 and that the amount of the boric acid was 136 g (2.2 mol). A pale-yellow polycarbonate was obtained. The viscosity-average molecular weight (Mv) of the obtained resin was 14,000 and the terminal hydroxyl content thereof was 35 mole %. The numbers of cleavages after storage are given in Table 5. Furthermore, the initial hue and the hue after storage at 160° C. for 720 hours are given in Table 5.

Comparative Example III-12

The same procedure as that of Example III-1 was repeated except that 0.2 mg ($5 \times 10^{-6}$ mol) of sodium hydroxide was used instead of the N,N-dimethyl-4-aminopyridine and other diphenyl carbonate having impurity contents given in Table 5 was used. A pale-red polycarbonate was obtained. The viscosity-average molecular weight (Mv) of the obtained resin was 30,500 and the terminal hydroxyl content thereof was 45 mole %. The numbers of cleavages after storage are given in Table 5. Furthermore, the initial hue and the hue after storage at 160° C. for 720 hours are given in Table 5.

TABLE 5

| | | Ex. III-1 | Ex. III-2 | Ex. III-3 | Ex. III-4 | Ex. III-5 | Ex. III-6 | Ex. III-7 | Ex. III-8 | Ex. III-9 | Ex. III-10 | Ex. III-11 | Comp. Ex. III-12 |
|---|---|---|---|---|---|---|---|---|---|---|---|---|---|
| Impurities in diphenyl carbonate (ppm) | Cl | 2 | 2 | <0.5 | 1.5 | 2 | <0.5 | 2 | 2 | 2 | 4 | 1 | 2 |
| | Fe | <0.5 | <0.5 | <0.5 | <0.5 | <0.5 | <0.5 | <0.5 | <0.5 | <0.5 | 1.5 | <0.5 | <0.5 |
| | Na | <0.5 | <0.5 | <0.5 | <0.5 | <0.5 | <0.5 | <0.5 | <0.5 | <0.5 | 1.5 | <0.5 | <0.5 |
| | Cu | <0.05 | <0.03 | <0.01 | <0.01 | <0.01 | <0.1 | <0.1 | <0.1 | <0.1 | <0.5 | 1.5 | <0.5 |
| | P | 15 | 10 | 15 | 1 | 13 | 12 | 15 | 15 | 12 | 10 | 10 | 10 |
| | Sn | 0.5 | 0.2 | 1.0 | 0.3 | 0.8 | 1.0 | 0.8 | 0.8 | 10.2 | 1.5 | 5.0 | 4.0 |
| | sum of phenyl salicylate, o-phenoxy-benzoic acid and phenyl o-phenoxy-benzoate | 30 | 35 | 38 | 45 | 35 | 35 | 30 | 30 | 35 | 70 | 40 | 35 |
| | methyl phenyl carbonate | 8 | 6 | 5 | 5 | 4 | 7 | 6 | 5 | 12 | 11 | 12 | 12 |
| | water content (wt %) | 0.25 | 0.23 | 0.28 | 0.25 | 0.21 | 0.23 | 0.25 | 0.23 | 0.25 | 0.25 | 0.20 | 0.23 |
| Thermal degradation (160° C.) | no. of cleavages after 10 days ($t_{10}$) | 0.03 | 0.03 | 0.04 | 0.08 | 0.02 | 0.01 | 0.01 | 0.01 | 0.06 | 0.03 | 0.03 | 0.06 |
| | no. of cleavages after 20 days ($t_{20}$) | 0.06 | 0.07 | 0.06 | 0.10 | 0.04 | 0.02 | 0.03 | 0.05 | 0.18 | 0.08 | 0.10 | 0.10 |
| | no. of cleavages after 30 days ($t_{30}$) | 0.08 | 0.08 | 0.09 | 0.10 | 0.08 | 0.04 | 0.03 | 0.05 | 0.28 | 0.14 | 0.18 | 0.14 |
| Heat resistance test hue (yellow Index) | initial ($t_0$) | 1.0 | 1.2 | 1.2 | 1.4 | 1.8 | 3.0 | 1.0 | 1.5 | 1.5 | 1.8 | 1.0 | 2.0 |
| | after 30 days ($t_{30}$) | 12 | 13 | 14 | 14 | 14 | 14 | 11 | 10.5 | 20 | 21 | 20 | 21 |

Example III-13

Another colorless transparent polycarbonate was prepared through polycondensation in the same manner as that of Example III-1 except that 245 mg ($2 \times 10^{-3}$ mol) of N,N-dimethyl-4-aminopyridine and 368 mg ($2 \times 10^{-3}$ mol) of carbonate of N,N-dimethyl-4-aminopyridine were used instead of the N,N-dimethyl-4-aminopyridine (489 mg, $4 \times 10^{-3}$ mol), the amount of boric acid used was 250 mg ($4 \times 10^{-3}$ mol) and other diphenyl carbonate having impurity contents given in Table 6 was used. The viscosity-average molecular weight (Mv) of the obtained resin was 28,400. The numbers of cleavages after storage are given in Table 6. Furthermore, the initial hue and the hue after storage at 160° C. for 720 hours are given in Table 6.

Example III-14

Another colorless transparent polycarbonate was prepared through polycondensation in the same manner as that of Example III-1 except that 1.98 g ($2 \times 10^{-2}$ mol) of ammonium hydrogenphosphate was used instead of the boric acid (1.2366 g, $2 \times 10^{-2}$ mol) and other diphenyl carbonate having impurity contents given in Table 6 was used. The viscosity-average molecular weight (Mv) of the obtained resin was 26,000. The numbers of cleavages after storage are given in Table 6. Furthermore, the initial hue and the hue after storage at 160° C. for 720 hours are given in Table 6.

Example III-15

2280 g (10 mol) of 2,2-bis(4-hydroxyphenyl)propane, 3400 g (10 mol) of 2,2-bis(4-hydroxy-3-t-butylphenyl)propane, 4349 g (20.3 mol) of diphenyl carbonate having impurity contents given in Table 6, 489 mg ($4 \times 10^{-3}$ mol) of N,N-dimethyl-4-aminopyridine and 1.2366 g ($2 \times 10^{-2}$ mol) of boric acid were fed into the same reactor as that used in Example III-1. The contents in the reactor was treated in the same manner as that of Example III-1 to prepare a polyester carbonate copolymer (random proportion: about 50%). The viscosity-average molecular weight (Mv) of the obtained resin was 26,500. The numbers of cleavages after storage are given in Table 6. Furthermore, the initial hue and the hue after storage at 160° C. for 720 hours are given in Table 6.

The random proportion of the polyester carbonate copolymer was determined by subjecting the copolymer to $^{13}C$-NMR spectroscopy according to the chemical shift of carbon in the carbonate bond.

Example III-16

3648 g (16 mol) of 2,2-bis(4-hydroxyphenyl)propane, 1272 g (4 mol) of diphenyl isophthalate, 4391.5 g (20.5 mol) of diphenyl carbonate having impurity contents given in Table 6, 489 mg ($4 \times 10^{-3}$ mol) of N,N-dimethyl-4-aminopyridine and 1.2366 g ($2 \times 10^{-2}$ mol) of boric acid were fed into the same reactor as that used in Example III-1. The contents in the reactor was molten in a nitrogen atmosphere at 180° C. and stirred together for one hour. Thereafter, the molten mixture was treated in the same manner as that of Example III-1 to conduct polycondensation, thus giving a polyester carbonate copolymer. The viscosity-average molecular weight (Mv) of the obtained resin was 29,200. The numbers of cleavages after storage are given in Table 6. Furthermore, the initial hue and the hue after storage at 160° C. for 720 hours are given in Table 6.

Example III-17

The same procedure as that of Example III-1 was repeated except that the amount of the boric acid was 12.366 g ($2\times10^{-2}$ mol mol) and other diphenyl carbonate having impurity contents given in Table 6 was used. A colorless transparent polycarbonate was obtained. The viscosity-average molecular weight (Mv) of the obtained resin was 18,500. The numbers of cleavages after storage are given in Table 6. Furthermore, the initial hue and the hue after storage. at 160° C. for 720 hours are given in Table 6.

TABLE 6

| | | Ex. III-13 | Ex. III-14 | Ex. III-15 | Ex. III-16 | Ex. III-17 |
|---|---|---|---|---|---|---|
| Impurities in diphenyl carbonate (ppm) | Cl | 1 | 1.5 | 2 | 2 | 1 |
| | Fe | <0.5 | <0.5 | <0.5 | <0.5 | <0.5 |
| | Na | <0.5 | <0.5 | <0.5 | <0.5 | <0.5 |
| | sum of phenyl salicylate, o-phenoxybenzoic acid and phenyl o-phenoxybenzoate | 40 | 35 | 30 | 35 | 40 |
| Thermal degradation (160° C.) | no. of cleavages after 10 days ($t_{10}$) | 0.04 | 0.08 | 0.02 | 0.01 | 0.03 |
| | no. of cleavages after 20 days ($t_{20}$) | 0.06 | 0.10 | 0.04 | 0.02 | 0.10 |
| | no. of cleavages after 30 days ($t_{30}$) | 0.09 | 0.10 | 0.08 | 0.04 | 0.18 |
| Heat resistance test hue (yellow Index) | initial ($t_0$) | 1.2 | 1.4 | 1.8 | 3.0 | 1.0 |
| | after 30 days ($t_{30}$) | 14 | 14 | 14 | 14 | 20 |

Example III-18

4560 g (20 mol) of 2,2-bis(4-hydroxyphenyl)propane, 4391.5 g (20.5 mol) of diphenyl carbonate having impurity contents given in Table 7, 489 mg ($1\times10^{-3}$ mol) of N,N-dimethyl-4-aminopyridine and 70 mg (1.13 mmol) of boric acid were fed into a nickel-lined reactor of bath type. The contents in the reactor was molten in a nitrogen atmosphere at 160° C. and stirred together for one hour. While evacuating the system gradually, the temperature of the obtained mixture was raised to conduct polycondensation finally in a vacuum of 1 Torr at 270° C. for 4 hours with formed phenol being distilled off. The resulting mixture was further reacted in a vertical twin-screw reactor of self-cleaning type for 50 minutes to give a colorless transparent polycarbonate. The viscosity-average molecular weight (Mv) of the polycarbonate was 29,000. The numbers of cleavages after storage, which indicate the degree of thermal degradation of the polycarbonate, are given in Table 7. Furthermore, to show the extent of discoloration of the polycarbonate with storage, the initial hue and the hue after storage at 160° C. for 720 hours are given in Table 7.

Example III-19

Another colorless transparent polycarbonate was prepared through polycondensation in the same manner as that of Example III-18 except that 736 mg ($4\times10^{-3}$ mol) of carbonate of N,N-dimethyl-4-aminopyridine was used instead of the N,N-dimethyl-4-aminopyridine (489 mg, $4\times10^{-3}$ mol), the amount of boric acid was 30 mg (0.49 mmol) and other diphenyl carbonate having impurity contents given in Table 7 was used. The viscosity-average molecular weight (Mv) of the obtained resin was 27,500. The numbers of cleavages after storage are given in Table 7. Furthermore, the initial hue and the hue after storage at 160° C. for 720 hours are given in Table 7.

Example III-20

Another colorless transparent polycarbonate was prepared through polycondensation in the same manner as that of Example III-18 except that 245 mg ($2\times10^{-3}$ mol) of N,N-dimethyl-4-aminopyridine and 368 mg ($2\times10^{-3}$ mol) of carbonate of N,N-dimethyl-4-aminopyridine were used instead of the N,N-dimethyl-4-aminopyridine (489 mg, $4\times10^{-3}$ mol), the amount of boric acid used was 50 mg (0.81 mmol) and other diphenyl carbonate having impurity contents given in Table 7 was used. The viscosity-average molecular weight (Mv) of the obtained resin was 28,400. The numbers of cleavages after storage are given in Table 7. Furthermore, the initial hue and the hue after storage at 160° C. for 720 hours are given in Table 7.

Example III-21

Another colorless transparent polycarbonate was prepared through polycondensation in The same manner as that of Example III-18 except that 112 mg (1.13 mmol) of ammonium hydrogenphosphate was used instead of the boric acid (70 mg, 1.13 mmol) and other diphenyl carbonate having impurity contents given in Table 7 was used. The viscosity-average molecular weight (Mv) of the obtained resin was 26,000. The numbers of cleavages after storage are given in Table 7. Furthermore, the initial hue and the hue after storage at 160° C. for 720 hours are given in Table 7.

Example III-22

2280 g (10 mol) of 2,2-bis(4-hydroxyphenyl)propane, 3400 g (10 mol) of 2,2-bis(4-hydroxy-3-t-butylphenyl)propane, 4349 g (20.3 mol) of diphenyl carbonate having impurity contents given in Table 7, 489 mg ($4\times10^{-3}$ mol) of N,N-dimethyl-4-aminopyridine and 70 mg (1.13 mmol) of boric acid were fed into the same reactor as that used in Example III-18. The contents in the reactor was treated in the same manner as that of Example III-18 to prepare a polyester carbonate copolymer (random proportion: about 50%). The viscosity-average molecular weight (Mv) of the obtained resin was 26,500. The numbers of cleavages after storage are given in Table 7. Furthermore, the initial hue and the hue after storage at 160° C. for 720 hours are given in Table 7.

The random proportion of the polyester carbonate copolymer was determined by subjecting the copolymer to $^{13}$C-NMR spectroscopy according to the chemical shift of carbon in the carbonate bond.

Example III-23

3648 g (16 mol) of 2,2-bis(4-hydroxyphenyl)propane, 1272 g (4 mol) of diphenyl isophthalate, 4391.5 g (20.5 mol) of diphenyl carbonate having impurity contents given in Table 7, 489 mg ($4\times10^{-3}$ mol) of N,N-dimethyl-4-aminopyridine and 70 mg (1.13 mmol) of boric acid were fed into the same reactor as that used in Example III-18. The contents in the reactor was molten in a nitrogen atmosphere at 180° C. and stirred together for one hour. Thereafter, the molten mixture was treated in the same manner as that of Example III-18 to conduct polycondensation, thus giving a polyester carbonate copolymer. The viscosity-average molecular weight (Mv) of The obtained resin was 29,200. The numbers of cleavages after storage are given in Table 7. Furthermore, The initial hue and the hue after storage at 160° C. for 720 hours are given in Table 7.

Example III-24

Another colorless transparent polycarbonate was prepared in the same manner as that of Example III-18 except that 100 ppm of tris(2,4-di-t-butylphenyl)phosphite as a phosphorus compound was further added in addition to the raw materials used in Example III-18. 200 ppm of octadecyl 3-(3,5-di-t-butyl-4-hydroxyphenyl)propionate as a hindered phenol was added to the polycarbonate obtained when the polycarbonate was still in a molten state to prepare a polycarbonate composition. The polycarbonate composition was extruded with a gear pump into a strand, which was cut. The viscosity-average molecular weight (Mv) of the polycarbonate was 26,700. The numbers of cleavages after storage are given in Table 7. Furthermore, the initial hue and the hue after storage at 160° C. for 720 hours are given in Table 7.

Example III-25

The same procedure as that of Example III-18 was repeated except that other diphenyl carbonate having impurity contents given in Table 7 was used and no boric acid was used. A colorless transparent polycarbonate was obtained. The viscosity-average molecular weight (Mv) of the obtained resin was 29,500. The numbers of cleavages after storage are given in Table 7. Furthermore, the initial hue and the hue after storage at 160° C. for 720 hours are given in Table 7.

boric acid was 70 mg (11.3 mmol). A colorless transparent polycarbonate was obtained. The viscosity-average molecular weight (Mv) of the obtained resin was 18,500. The numbers of cleavages after storage are given in Table 7. Furthermore, the initial hue and the hue after storage at 160° C. for 720 hours are given in Table 7.

Comparative Example III-28

The same procedure as that of Example III-18 was repeated except that 0.2 mg ($5 \times 10^{-6}$ mol) of sodium hydroxide was used instead of the N,N-dimethyl-4-aminopyridine and other diphenyl carbonate having impurity contents given in Table 7 was used. A polycarbonate was obtained. The viscosity-average molecular weight (Mv) of the obtained resin was 30,500. The numbers of cleavages after storage are given in Table 7. Furthermore, the initial hue and the hue after storage at 160° C. for 720 hours are given in Table 7.

TABLE 7

| | | Ex. III-18 | Ex. III-19 | Ex. III-20 | Ex. III-21 | Ex. III-22 | Ex. III-23 | Ex. III-24 | Ex. III-25 | Ex. III-26 | Ex. III-27 | Comp. Ex. III-28 |
|---|---|---|---|---|---|---|---|---|---|---|---|---|
| Impurities in diphenyl carbonate (ppm) | Cl | 2 | 2 | 1 | 1.5 | 2 | 2 | 2 | 2 | 4 | 1 | 2 |
| | Fe | <0.5 | <0.5 | <0.5 | <0.5 | <0.5 | <0.5 | <0.5 | <0.5 | 1.5 | <0.5 | <0.5 |
| | Na | <0.5 | <0.5 | <0.5 | <0.5 | <0.5 | <0.5 | <0.5 | <0.5 | 1.5 | <0.5 | <0.5 |
| | sum of phenyl salicylate, o-phenoxy-benzoic acid and phenyl o-phenoxy-benzoate | 30 | 35 | 40 | 35 | 30 | 35 | 30 | 35 | 70 | 40 | 35 |
| Thermal degradation (160° C.) | no. of cleavages after 10 days ($t_{10}$) | 0.03 | 0.03 | 0.04 | 0.08 | 0.02 | 0.01 | 0.01 | 0.06 | 0.03 | 0.03 | 0.06 |
| | no. of cleavages after 20 days ($t_{20}$) | 0.06 | 0.07 | 0.06 | 0.10 | 0.04 | 0.02 | 0.03 | 0.08 | 0.08 | 0.10 | 0.10 |
| | no. of cleavages after 30 days ($t_{30}$) | 0.08 | 0.08 | 0.09 | 0.10 | 0.08 | 0.04 | 0.03 | 0.18 | 0.14 | 0.18 | 0.14 |
| Heat resistance test hue (yellow Index) | initial ($t_0$) | 1.0 | 1.2 | 1.2 | 1.4 | 1.8 | 3.0 | 1.0 | 1.5 | 1.8 | 1.0 | 2.0 |
| | after 30 days ($t_{30}$) | 12 | 13 | 14 | 14 | 14 | 14 | 11 | 20 | 21 | 20 | 21 |

Example III-26

The same procedure as that of Example III-18 was repeated except that diphenyl carbonate containing the specific impurities in larger amounts was used instead of the diphenyl carbonate used in Example III-18. A pale-yellow polycarbonate was obtained. The viscosity-average molecular weight (Mv) of the obtained resin was 28,600. The numbers of cleavages after storage are given in Table 7. Furthermore, the initial hue and the hue after storage at 160° C. for 720 hours are given in Table 7.

Example III-27

The same procedure as that of Example III-18 was repeated except that other diphenyl carbonate having impurity contents given in Table 7 was used and the amount of the

Example IV-1

22.8 g (0.1 mol) of 2,2-bis(4-hydroxyphenyl)propane (BPA), 0.164 g ($2 \times 10^{-2}$ mol per mol of BPA) of 2-methylimidazole, 0.00082 g ($1 \times 10^{-4}$ mol per mol of BPA) of sodium acetate and 21.96 g (0.1025 mol) of diphenyl carbonate having impurity contents given in Table 8 were fed into a reactor and stirred together in a nitrogen atmosphere at 180° C. for one hour. The temperature of the resulting mixture was raised while gradually evacuating the reaction system. Finally, the mixture was polycondensed at 270° C. in a vacuum of 0.1 Torr for one hour, with the removal of formed phenol by distillation. Thus, a colorless transparent polycarbonate was obtained. The viscosity-average molecular weight (Mv) thereof was 27,600. The glass transition point thereof was 150° C. and the terminal hydroxyl content thereof was 28 mole %. To show the extent of discoloration thereof with storage, the initial hue and the hue after storage at 160° C. for 720 hours are given in Table 9.

Example IV-2

Another colorless transparent polycarbonate was prepared through polycondensation in the same manner as that of Example IV-1 except that 0.00122 g ($1\times10^{-4}$ mol per mol of BPA) of 4-dimethylaminopyridine was used instead of the 2-methylimidazole, 0.00098 g ($1\times10^{-4}$ mol per mol of BPA) of potassium carbonate was used and other diphenyl carbonate having impurity contents given in Table 8 was used. The viscosity-average molecular weight (Mv) thereof was 27,000. The glass transition point thereof was 150° C. and the terminal hydroxyl content thereof was 25 mole %. The initial hue and the hue after storage at 160° C. for 720 hours are given in Table 9.

Example IV-3

11.4 g (50 mole % of the dihydric phenol to be used) of 2,2-bis(4-hydroxyphenyl)propane, 17.0 g (50 mole % of the dihydric phenol to be used) of 2,2-bis-(4-hydroxy-3-t-butylphenyl)propane, 0.00122 g ($1\times10^{-4}$ mol per mol of bisphenol, i.e., the dihydric phenol) of 4-dimethylaminopyridine, 0.000066 g ($1\times10^{-5}$ mol per mol of bisphenol, i.e., the dihydric pheno) of lithium acetate and 21.96 g (0.1025 mol) of diphenyl carbonate having impurity contents given in Table 8 were fed into a reactor and stirred together in a nitrogen atmosphere for 2 hours. The resulting mixture was polycondensed in the same manner as that of Example IV-1 to rive a colorless transparent polycarbonate. The viscosity-average molecular weight (Mv) thereof was 24,500 and the glass transition point thereof was 128° C. The terminal hydroxyl content thereof was 23 mole %. The initial hue and the hue after storage at 160° C. for 720 hours are given in Table 9.

Example IV-4

Another colorless transparent polycarbonate was prepared through polycondensation in the same manner as that of Example IV-1 except that 0.00091 g ($1\times10^{-4}$ mol per mol of BPA) of tetramethylammonium hydroxide was used instead of the 2-methylimidazole, 0.00098 g ($1\times10^{-4}$ mol per mol of BPA) of potassium acetate was used and other starting diphenyl carbonate having impurity contents given in Table 8 was used, and that the contents in the reactor, that is, the raw materials, were stirred together in a nitrogen atmosphere for 2 hours. The viscosity-average molecular weight (Mv) thereof was 27,800 and the glass transition point thereof was 151° C. Further, the terminal hydroxyl content thereof was 21 mole %. The initial hue and the hue after storage at 160° C. for 720 hours are given in Table 9.

Example IV-5

22.8 g (0.1 mol) of 2,2-bis(4-hydroxyphenyl)propane (BPA), 0.0024 g ($2\times10^{-4}$ mol per mol of BPA) of 4-dimethylaminopyridine and 21.96 g (0.1025 mol) of diphenyl carbonate having impurity contents given in Table 8 were fed into a reactor and the resulting mixture was polycondensed in the same manner as that of Example IV-1 to give a colorless transparent polycarbonate. The viscosity-average molecular weight (Mv) thereof was 29,000 and the glass transition point thereof was 150° C. Further, the terminal hydroxyl content thereof was 26 mole %. The initial hue and the hue after storage at 160° C. for 720 hours are given in Table 9.

Comparative Example IV-6

22.8 g (0.1 mol) of 2,2-bis(4-hydroxyphenyl)propane (BPA), 0.0024 g ($2\times10^{-4}$ mol per mol of BPA) of N,N-dimethylaminopyridine, 0.00098 g ($1\times10^{-4}$ mol per mol of BPA) of potassium acetate and 21.96 g (0.1025 mol) of diphenyl carbonate having impurity contents given in Table 8 were fed into a reactor and the resulting mixture was polycondensed in the same manner as that of Example IV-1 to give a polycarbonate. The viscosity-average molecular weight (Mv) thereof was 19,500 and the glass transition point thereof was 130° C. The terminal hydroxyl content thereof was 35 mole %. The initial hue and the hue after storage at 160° C. for 720 hours are given in Table 9.

Comparative Example IV-7

22.8 g (0.1 mol) of 2,2-bis(4-hydroxyphenyl)propane (BPA), 0.0024 g ($2\times10^{-4}$ mol per mol of BPA) of N,N-dimethylaminopyridine, 0.00098 g ($1\times10^{-4}$ mol per mol of BPA) of potassium acetate and 21.96 g (0.1025 g) of diphenyl carbonate having impurity contents given in Table 8 were fed into a reactor and the resulting mixture was polycondensed in the same manner as that of Example IV-1 to give a polycarbonate. The viscosity-average molecular weight (Mv) thereof was 24,500 and the glass transition point thereof was 145° C. Further, the terminal hydroxyl content thereof was 28 mole %. The initial hue and the hue after storage at 160° C. for 720 hours are given in Table 9.

TABLE 8

| Kinds of impurities | Ex. IV-1 | Ex. IV-2 | Ex. IV-3 | Ex. IV-4 | Ex. IV-5 | Comp. Ex. IV-6 | Comp. Ex. IV-7 |
|---|---|---|---|---|---|---|---|
| phenyl salicylate and o-phenoxy-benzoic acid | 40 ppm | 42 ppm | 38 ppm | 45 ppm | 35 ppm | 58 ppm | 70 ppm |
| chlorine | <0.5 ppm | <0.5 ppm | <0.5 ppm | <0.5 ppm | <0.5 ppm | <0.5 ppm | <0.5 ppm |
| sodium ion | <0.5 ppm | <0.5 ppm | <0.5 ppm | <0.5 ppm | <0.5 ppm | 0.8 ppm | 0.8 ppm |
| iron ion | <0.1 ppm | <0.1 ppm | <0.1 ppm | <0.1 ppm | <0.1 ppm | 0.5 ppm | 0.7 ppm |
| copper ion | <0.05 ppm | <0.02 ppm | <0.01 ppm | <0.005 ppm | <0.01 ppm | 0.5 ppm | 0.6 ppm |
| phosphorus | 12 ppm | 10 ppm | 15 ppm | 1 ppm | 13 ppm | 15 ppm | 18 ppm |
| water | 0.25 wt % | 0.23 wt % | 0.28 wt % | 0.25 wt % | 0.21 wt % | 0.40 wt % | 0.25 wt % |

TABLE 9

|  |  | Ex. IV-1 | Ex. IV-2 | Ex. IV-3 | Ex. IV-4 | Ex. IV-5 | Comp. Ex. IV-6 | Comp. Ex. IV-7 |
|---|---|---|---|---|---|---|---|---|
| Heat sta- bility | initial hue (YI) | 1.5 | 1.6 | 1.8 | 1.8 | 1.3 | 2.1 | 1.9 |
|  | hue after storage at 160° C. for 720 hours (YI) | 10.8 | 12.5 | 16.3 | 14.1 | 10.2 | 38.3 | 45.3 |

The present invention will now be described in more detail with reference to the following embodiments which should not be considered to limit the scope of the present invention.

What we claim is:

1. A process for the preparation of a thermally stable polycarbonate by melt-polycondensing a dihydric phenol with a carbonic diester, which comprises using a compound selected from the group consisting of alkali metal and alkaline earth metal borates as a catalyst, wherein said catalyst is introduced into the process in the form of a single compound.

2. The process for the preparation of a thermally stable polycarbonate as set forth in claim 1, wherein the amount of the borates as a catalyst is $10^{-6}$ to $10^{-1}$ mol per mol of the dihydric phenol.

3. The process for the preparation of a thermally stable polycarbonate as set forth in claim 1, wherein an acidic substance, having a pKa above 3, is utilized to neutralize the catalyst.

4. The process for the preparation of a thermally stable polycarbonate as set forth in claim 3, wherein the amount of the acidic substance is 1 to 500 times by mol that of the borates as a catalyst.

5. The process for the preparation of a thermally stable polycarbonate as set forth in claim 3, wherein the amount of the acidic substance is 1 to 20 times by mol that of the borates as a catalyst.

6. The process for the preparation of a thermally stable polycarbonate as set forth in claim 3, wherein the acidic substance is selected from the group consisting of boric acid, ammonium hydrogen phosphite and mixtures thereof.

7. The process for the preparation of a thermally stable polycarbonate as set forth in claim 1, wherein the carbonic diester has a total water content of no greater than 0.3% by weight, a chlorine content of no greater than 3 ppm, a sodium ion content of no greater than 1 ppm, an iron ion content of no greater than 1 ppm, a copper ion content of no greater than 1 ppm, a phosphorus ion content of no greater than 20 ppm, a sum of phenyl salicylate, o-phenoxybenzoic acid and phenyl o-phenoxybenzoate contents of no greater than 50 ppm, a tin ion content of no greater than 5 ppm and a methyl phenyl carbonate content of no greater than 50 ppm.

8. The process for the preparation of a thermally stable polycarbonate as set forth in claim 1, wherein the carbonic diester has a chlorine content of no greater than 3 ppm, a sodium ion content of no greater than 1 ppm, an iron ion content of no greater than 1 ppm, a sum of phenyl salicylate, o-phenoxybenzoic acid and phenyl o-phenoxybenzoate contents of no greater than 50 ppm, and a methyl phenyl carbonate content of no greater than 10 ppm.

9. The process for the preparation of a polycarbonate as set forth in claim 1, wherein the carbonic diester is used in an amount of 1.01 to 1.5 mol per mol of the dihydric phenol.

10. The process for the preparation of a polycarbonate as set forth in claim 1, wherein the formed polycarbonate has a terminal hydroxyl concentration of 3 to 30 mole %.

11. The process for the preparation of a polycarbonate as set forth in claim 1, wherein the dihydric phenol is a compound selected from the group consisting of compounds represented by the following general formulae (I) to (IV):

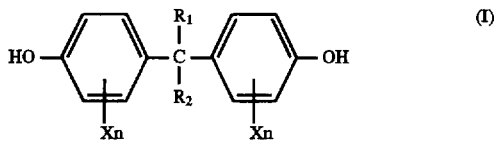

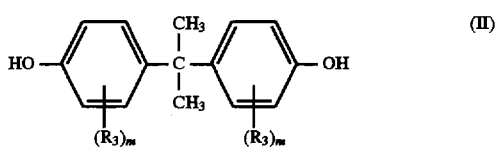

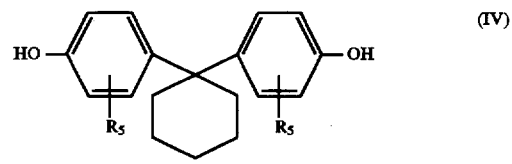

wherein $R_1$, $R_2$, $R_3$, $R_4$ and $R_5$ are each a hydrogen atom, a linear or branched alkyl group having 1 to 8 carbon atoms or a phenyl group; X is a halogen atom; n is 0 or an integer of 1 to 4 and m is an integer of 1 to 4.

12. The process for the preparation of a polycarbonate as set forth in claim 1, wherein no less than two dihydric phenols are used to prepare a copolymer.

13. The process for the preparation of a polycarbonate as set forth in claim 1, wherein a compound selected from the group consisting of a phosphorus compound, a hindered phenol and mixtures thereof is used.

14. A process for the preparation of a thermally stable polycarbonate composition, which comprises adding an acidic substance which can neutralize a catalyst to the polycarbonate prepared the process according to claim 1.

15. A process for the preparation of a thermally stable polycarbonate composition, which comprises adding a phosphorus compound and/or a hindered phenol to the polycarbonate prepared the process according to claim 1.

16. The process for the preparation of a polycarbonate as set forth in claim 1, wherein no less than two carbonic diesters are used to prepare a copolymer.

17. The process for the preparation of a polycarbonate as set forth in claim 1, wherein no less than two dihydric phenols and no less than two carbonic diesters are used to prepare a copolymer.

* * * * *